United States Patent
Lynch-Branzoi et al.

(10) Patent No.: US 11,807,757 B2
(45) Date of Patent: Nov. 7, 2023

(54) ECONOMICAL MULTI-SCALE REINFORCED COMPOSITES

(71) Applicant: Rutgers, The State University of New Jersey, New Brunswick, NJ (US)

(72) Inventors: Jennifer K. Lynch-Branzoi, Franklin Park, NJ (US); Thomas J. Nosker, Stockton, NJ (US); Justin W. Hendrix, Washington, DC (US); Arya S. Tewatia, Piscataway, NJ (US)

(73) Assignee: RUTGERS, THE STATE UNIVERSITY OF NEW JERSEY, New Brunswick, NJ (US)

(*) Notice: Subject to any disclaimer, the term of this patent is extended or adjusted under 35 U.S.C. 154(b) by 366 days.

(21) Appl. No.: 16/868,095

(22) Filed: May 6, 2020

(65) Prior Publication Data

US 2020/0354572 A1    Nov. 12, 2020

Related U.S. Application Data

(60) Provisional application No. 62/844,544, filed on May 7, 2019.

(51) Int. Cl.
  C08L 81/06    (2006.01)
  C08L 61/16    (2006.01)
  C08J 5/04     (2006.01)
  C08J 3/00     (2006.01)

(52) U.S. Cl.
  CPC .............. *C08L 81/06* (2013.01); *C08J 5/042* (2013.01); *C08L 61/16* (2013.01); *C08J 3/005* (2013.01)

(58) Field of Classification Search
  USPC .............. 525/434, 436, 437, 439; 428/297.4, 428/299.4
  See application file for complete search history.

(56) References Cited

U.S. PATENT DOCUMENTS

| | | | |
|---|---|---|---|
| 5,298,214 A | 3/1994 | Morrow et al. |
| 5,789,477 A | 8/1998 | Nosker et al. |
| 5,916,932 A | 6/1999 | Nosker et al. |
| 6,042,765 A | 3/2000 | Sugahara et al. |
| 6,962,431 B1 | 11/2005 | Luker |
| 7,465,605 B2 | 12/2008 | Raravikar et al. |
| 7,745,528 B2 | 6/2010 | Prud'Homme et al. |
| 7,906,053 B1 | 3/2011 | Torkelson et al. |
| 8,167,190 B1 | 5/2012 | Bullock et al. |
| 8,303,876 B1 | 11/2012 | Torkelson et al. |
| 8,734,696 B1 | 5/2014 | Torkelson et al. |
| 8,871,826 B2 | 10/2014 | Butzloff et al. |
| 9,139,440 B2 | 9/2015 | Felisari et al. |
| 9,597,657 B1 | 3/2017 | Zhamu et al. |
| 9,896,565 B2 | 2/2018 | Nosker et al. |
| 10,253,154 B2 | 4/2019 | Nosker et al. |
| 10,329,391 B2 | 6/2019 | Nosker et al. |
| 11,059,945 B2 | 7/2021 | Nosker et al. |
| 11,098,175 B2 | 8/2021 | Nosker et al. |
| 11,174,366 B2 | 11/2021 | Nosker et al. |
| 11,225,558 B2 | 1/2022 | Nosker et al. |
| 2005/0186378 A1 | 8/2005 | Bhatt |
| 2006/0047052 A1 | 3/2006 | Barrera et al. |
| 2006/0062986 A1 | 3/2006 | Magario et al. |
| 2007/0099792 A1 | 5/2007 | Khabashesku et al. |
| 2008/0279756 A1 | 11/2008 | Zhamu et al. |
| 2009/0087661 A1 | 4/2009 | Eder |
| 2010/0124713 A1 | 5/2010 | Farrugia et al. |
| 2010/0147188 A1 | 6/2010 | Mamak et al. |
| 2010/0317790 A1 | 12/2010 | Jang et al. |
| 2011/0017955 A1 | 1/2011 | Zhamu et al. |
| 2011/0114189 A1 | 5/2011 | Crain et al. |
| 2011/0133134 A1 | 6/2011 | Varma et al. |
| 2011/0143058 A1 | 6/2011 | Nosker et al. |
| 2011/0186789 A1 | 8/2011 | Samulski et al. |
| 2011/0260116 A1 | 10/2011 | Plee et al. |
| 2012/0065299 A1 | 3/2012 | Lukehart et al. |
| 2012/0068124 A1 | 3/2012 | Dickinson et al. |
| 2012/0142832 A1 | 6/2012 | Varma et al. |
| 2012/0264836 A1 | 10/2012 | Felisari et al. |
| 2012/0328946 A1 | 12/2012 | Bosnyak et al. |
| 2013/0018204 A1 | 1/2013 | Jeon et al. |
| 2013/0072613 A1 | 3/2013 | Miltner et al. |
| 2013/0295367 A1 | 11/2013 | Compton et al. |
| 2014/0042390 A1 | 2/2014 | Gruner et al. |
| 2014/0058046 A1 | 2/2014 | Sawa et al. |

(Continued)

FOREIGN PATENT DOCUMENTS

CA    2909715 A1    10/2014
CN    101558455 A    10/2009

(Continued)

OTHER PUBLICATIONS

Thomas Dooher et al. Novel thermoplastic yarnfor the through-thickness reinforcement of fibre-reinforced polymer composites; Journal of Thermoplastic Composite Materials, vol. 31(12) 1619-1633 (Year: 2018).*
Paton, et al: Scalable Production of Large Quantities of Defect-Free, Few-Layer Graphene by Shear Exfoliation in Liquids, Nature Mater, 13, Apr. 20, 2014 (Apr. 20, 2014) retrieved via the internet on Dec. 9, 2019 (Dec. 9, 2019) <url: https://www.nature.com/articles/nmat3944> Abstract.
Whieb, Nofel Z: "Processing, Characteristics and Properties of CNT-Enhanced PA 66", Published May 2, 2018, A dissertation submitted to the Graduate School—New Brunswick, Rutgers, The State University of New Jersey, Oct. 2017.
Tewatia, et al: "High Shear Melt-Processing of Polyetherethereketone Enhanced Polysulfone Immiscible Polymer Blends", Antec Orlando, The Plastics Technology Conference, Orange County Convention Center, Orlando, FL, May 7-10, 2018.

(Continued)

*Primary Examiner* — Terressa Boykin
(74) *Attorney, Agent, or Firm* — FOX ROTHSCHILD LLP

(57) ABSTRACT

Disclosed are co-continuous immiscible polymer blends of a polysulfone and a polyaryletherketone optionally reinforced with carbon fiber. A method of preparing such a co-continuous immiscible polymer blend of a polysulfone and a polyaryletherketone reinforced with a carbon fiber is also disclosed.

17 Claims, 28 Drawing Sheets

(56) References Cited

U.S. PATENT DOCUMENTS

| | | |
|---|---|---|
| 2014/0083752 A1 | 3/2014 | Walczak et al. |
| 2014/0094541 A1 | 4/2014 | Shah et al. |
| 2014/0141257 A1 | 5/2014 | Ranade et al. |
| 2014/0183415 A1 | 7/2014 | Song |
| 2015/0267030 A1 | 9/2015 | Nosker et al. |
| 2016/0009561 A1 | 1/2016 | Coleman et al. |
| 2016/0332136 A1 | 11/2016 | Zhang et al. |
| 2017/0207000 A1 | 7/2017 | Prestayko et al. |
| 2017/0218141 A1 | 8/2017 | Nosker et al. |
| 2017/0352868 A1 | 12/2017 | Zhamu et al. |
| 2019/0062521 A1 | 2/2019 | Nosker et al. |
| 2020/0362137 A1 | 11/2020 | Nosker et al. |
| 2021/0163747 A1* | 6/2021 | So .................. C08L 97/007 |

FOREIGN PATENT DOCUMENTS

| | | |
|---|---|---|
| CN | 101817516 A | 9/2010 |
| CN | 103842422 A | 6/2014 |
| CN | 104884243 A | 9/2015 |
| CN | 104945659 A | 9/2015 |
| CN | 104945694 A | 9/2015 |
| CN | 105324241 A | 2/2016 |
| CN | 107400246 A | 11/2017 |
| EP | 2287244 A1 | 2/2011 |
| EP | 2612889 A1 | 7/2013 |
| EP | 2905256 A1 | 8/2015 |
| JP | H08-053571 A | 2/1996 |
| JP | 2003-138145 A | 5/2003 |
| JP | 2003-531802 A | 10/2003 |
| JP | 2004-162203 A | 6/2004 |
| JP | 2004-183127 A | 7/2004 |
| JP | 2007-524735 A | 8/2007 |
| JP | 2008-266577 A | 11/2008 |
| JP | 2009-542839 A | 12/2009 |
| JP | 2011-038078 A | 2/2011 |
| JP | 2011-513167 A | 4/2011 |
| JP | 2012500179 A | 1/2012 |
| JP | 2012-136712 A | 7/2012 |
| JP | 2013018825 A | 1/2013 |
| JP | 2013-507477 A | 3/2013 |
| JP | 2013-233790 A | 11/2013 |
| JP | 2015537075 A | 12/2015 |
| JP | 2016-509122 A | 3/2016 |
| JP | 2016519191 A | 6/2016 |
| JP | 2017531052 A | 10/2017 |
| JP | 6393743 B2 | 9/2018 |
| JP | 2018-158453 A | 10/2018 |
| JP | 6633703 B2 | 1/2020 |
| KR | 10-2011-0018024 A | 2/2011 |
| KR | 10-2012-0009978 A | 2/2012 |
| TW | 201915053 A | 4/2019 |
| WO | 07145918 A2 | 12/2007 |
| WO | 2009018204 A1 | 2/2009 |
| WO | 2009029984 A1 | 3/2009 |
| WO | 2010107763 | 9/2010 |
| WO | 2010115173 A1 | 10/2010 |
| WO | 2011/042800 A1 | 4/2011 |
| WO | 2011/055198 A1 | 5/2011 |
| WO | 2012/133303 | 1/2012 |
| WO | 2012013303 A1 | 2/2012 |
| WO | 2012020099 A1 | 2/2012 |
| WO | 2012049121 A1 | 4/2012 |
| WO | 2013/058181 A1 | 4/2013 |
| WO | 2013/146213 A1 | 10/2013 |
| WO | 2014/062226 A1 | 4/2014 |
| WO | 20140172619 A1 | 10/2014 |
| WO | 2015044478 | 4/2015 |
| WO | 2015112088 A2 | 7/2015 |
| WO | 2016018995 A1 | 2/2016 |
| WO | 16106312 A2 | 6/2016 |

OTHER PUBLICATIONS

Tewatia, et al: "Multi-Scale Carbon (Micro/Nano) Fiber Reinforcement of Polyetheretherketone Using High Shear Melt-Processing", Fibers, 2017, 5, 32; doi:10.3390/fib5030032, pp. 1-11.

Lynch, et al: Applying Almmiscible Polymer Blend Concepts to Achieve an Amplified Orientation and Property Effect on Multi-scale Reinforced Compositions, Sep. 2012.

Luker, K., "Summary Results of a Novel Single Screw Compounder", SPE-ANTEC Technical Papers, 2007, pp. 459-463.

Luker, K., "Randcastle Extrusion Systems, Inc—Microtruder Brochure", III, 2008.

Lynch, et al: "Development of Novel One-Step Hybrid Processing", SPE-ANTEC Technical Papers, 2010, pp. 2076-2080.

Jordhamo, et al: "Phase Continuity and Inversion in Polymer Blends and Simultaneous Interpenetrating Networks", Polymer Engineering and Science, vol. 26, No. 8, Apr. 1986, pp. 517-524.

Bao, et al: "Preparation of Graphene by Pressurized Oxidation and Multiplex Reduction and its Polymer Nanocomposites by Masterbatch-Based Melt Blending", Journal of Materials Chemistry, Jan. 1, 2012, vol. 22, No. 13, pp. 6088-6096.

Jonathan N. Coleman: "Liquid Exfoliation of Defect-Free Graphene, Accounts of Chemical Research", 2013, vol. 46, No. 1, pp. 14-22.

Dez-Pascual, et al: "High-Performance Nanocomposites Based on Polyetherketones", Progress In Materials Science, Pergamon Press, GB, vol. 57, No. 7, Mar. 4, 2012 (Mar. 4, 2012), pp. 1106-1190, XP028514432, ISSN: 0079-6425, DOI: 10.1016/J.PMATSCI.2012.03.003 [retrieved on Mar. 29, 2012].

Choudhary, et al: "Polymer/Carbon Nanotube Nanoxmposites", Aug. 17, 2011, Chapter 4, pp. 65-90. Retrieved from the Internet: <https://www.intechopen.com/books/carbon-nanotubes-polymer-nanocomposites/polymer-carbon-nanotube-nanocomposites>.

Eda, et al: Chemically Derived Graphene Oxide: Towards Large-Area Thin-Film Electronics and Optoelectronics; Advanced Materials, 2010, vol. 22, pp. 2392-2415.

Lu, et al.: "Preparation of Polyethylene/Expanded Graphite Intercalated Composites by In-situ Expanding Method", China Plastics, Jul. 31, 2009, vol. 23, No. 7, pp. 49-54.

Nixon, A.: "Understanding Graphene—Part 1", Feb. 4, 2016. [retrieved Nov. 18, 2016]. Retrieved from the Internet: <http://investorintel.com/technology-metals-intel/understanding-graphene-part-1-graphene-and-graphite/>.

Novoselov et al., "Electric Field Effect in Atomically Thin Carbon Films," Science (2004); 306:666-669.

Paton et al: "Scale-up of Liquid Exfoliation of Graphene", Thomas Swan Advanced Materials, Retrieved from the Internet: URL: https://www.tcd.ie/Physics/research/groups/1d-nanostructures/files/posters/ChemOnTubes%20Poster%20KP.pdf>. Publication [unknown, not earlier than 2014].

Paton et al: "Scalable Production of Large Quantities of Defect-Free Few-Layer Graphene by Shear Exfoliation in Liquids", Nature Materials, Jun. 2014, vol. 13, pp. 624-630.

Randcastle Extrusion Systems, Inc., Nov. 1, 2006, XP055279030, retrieved from the Internet: URL: http://www.feedscrewdesigns.com/ubb/Forum1/HTML/000521.html [retrieved on Jun. 9, 2016], pp. 1-3.

Thomas Swan; "Elicarb Graphene Epoxy Dispersion", Advanced Materials, Publication [unknown].

Peeterbroeck, et al: "How Carbon Nanotube Crushing Can Improve Flame Retardant Behaviour in Polymer Nanocomposites?", Macromolecular Rapid Communications, vol. 28, No. 3, Feb. 2, 2007 (Feb. 2, 2007), pp. 260-264, XP055669652, DE, ISSN: 1022-1336, DOI: 10.1002/marc.200600614.

Rangari et al: "Alignment of Carbon Nanotubes and Reinforcing Effects in Nylon-6 Polymer Composite Fibers", Nanotechnology Instititute of Physics Publishing, GB, vol. 19, No. 24, Jun. 18, 2008 (Jun. 18, 2008), pp. 1-9, XP002679937, ISSN: 0957-4484, DOI: DOI:10.1088/0957-4484/19/24/245703 [retrieved on May 12, 2008].

Wakabayashi, et al.: "Polymer-Graphite Nanocomposites: Effective Dispersion and Major Property Enhancement via Solid-State Shear Pulverization", Macromolecules, American Chemical Society, Feb. 29, 2008, vol. 41, No. 6, pp. 1905-1908, XP-002743181.

(56) References Cited

OTHER PUBLICATIONS

Xie, et al "Boron Nitride Nanosheets As New Barrier Additive For Plastic Packaging", New/Nano Materials. Retrieved from the Internet <URL: https://www.tcd.ie./Physics/research/groups/1d-nanostructures/files/posters/NewNano%20-%2034_poster_Shaobo%20Xie.pdf>, Publication [unknown, no earlier than 2013].

Liu et al: "A Controllable Self-Assembly Method for Large-Scale Synthesis of Graphene Sponges and Free-Standing Graphene Films", Advanced Functional Materials, 2010, 20, 1930-1936, DOI: 10.1002/adfm.201000287 (XP-001554543).

"BASF Polystyrol 158 K Polystyrene (Global)", MatWeb Material Property Data, Retrieved from Internet Jul. 15, 2022; Retrieved from Internet: <https://www.matweb.com/search/datasheet.aspx?matguide-b011e2c0a7974492a5e0ed73c08a3454>.

Sathyanarayana et al: "Compounding of MWCNTs with PS in a Twin-Screw Extruder with Varying Process Parameters: Morphology, Interfacial Behavior, Thermal Stability, Rheology, and Volume Resistivity", Macromolecular Materials and Engineering, 2013, 298, 89-105.

Takase et al: :Dispersion of Carbon-Nanotubes in a Polymer Matrix by a Win-Screw Extruder, 2002, vol. 14, No. 2, pp. 126-131, Online ISSN 1883-7417, Print ISSN 0915-4027, <https://doi.org/10.4325/seikeikakou.14.126>, Retrieved on Internet: <<https://www.jstage.jst.go.jp/article/seikeikakou1989/14/2/14_2_126/_article/-char/ja>>.

\* cited by examiner

ECONOMICAL MULTI-SCALE REINFORCED COMPOSITES

CROSS-REFERENCE TO RELATED APPLICATIONS

This application claims the benefit of U.S. Provisional Patent Application Ser. No. 62/844,544, filed May 7, 2019, which is herein incorporated by reference in its entirety.

FIELD OF THE INVENTION

The present disclosure relates to economical multi-scale reinforced composites comprising carbon fiber-reinforced co-continuous immiscible polymer blends (IMPBs) of a polysulfone, such as a polyarylethersulfone (PSU) and a polyaryletherketone, such as polyetheretherketone (PEEK).

BACKGROUND

The development of co-continuous immiscible polymer blends (IMPBs) offer versatility in tailoring physical properties via synergistic combinations of the blend components, and is more economical than chemical synthesis and development of a new polymer. Additional physical property enhancements are possible by fiber reinforcement of the lower viscosity phase to achieve fiber self-alignment within the IMPB composite during processing, as in fiberglass reinforced polypropylene blended with HDPE, (FRPP)/HDPE. The oriented FRPP/HDPE composite requires only ⅓ of the fibers versus a randomly oriented fiberglass reinforced polymer in order to achieve the same properties as measured along a particular axis. This translates to lower costs and less wear on processing equipment.

Fiber-reinforced PEEK is a useful fiber-reinforced polymer matrix composite useful for fabrication of various lightweight yet strong component parts in the high-end polymer market. However, the cost of PEEK is relatively high. There is a need for more cost-effective fiber-reinforced high-end polymer materials.

SUMMARY

The present disclosure presents solutions to meet these needs.

Thus, a primary goal of the present invention is to develop a high performance IMPB, and multi-scale reinforcement, of this IMPB to result in an amplified effect on the composite's properties through self-alignment of the reinforcing agents during processing. The high performance engineering-grade polymers utilized include PEEK and PSU as commercially available representatives of the polyaryletherketone and polysulfone families, respectively. The cost of PSU can be at least one-third the cost of PEEK, depending on the quantity purchased, so a co-continuous IMPB would reduce cost. It was discovered that addition of PSU dilutes the material cost of PEEK without sacrificing performance. The fiber-reinforcing agents were selected from carbon nanofiber (CNF) and chopped carbon microfiber (CF).

Advantages of utilizing IMPB concepts and multi-scale reinforcement include:
1. Self-alignment of the reinforcing agent (CNF, CF) during processing;
2. An amplified effect of the reinforcing agent on the resulting composite's properties;
3. Less reinforcing agents required to achieve the same mechanical properties of a reinforced homo-polymer;
4. Overall reduced costs;
5. A light-weight alternative to traditional materials used in the aerospace, automotive, and high-end construction industries.

One aspect of the invention is directed to a co-continuous immiscible polymer blend of a polysulfone and a polyaryletherketone reinforced with a carbon fiber. The polysulfone can have the structure

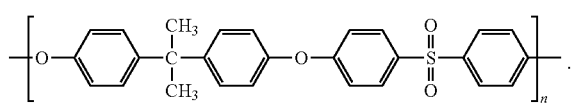

The polyaryletherketone can be polyetheretherketone (PEEK), having the structure

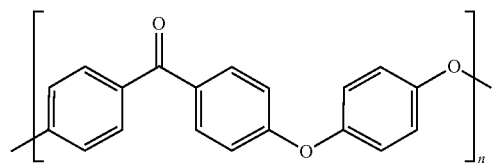

The carbon fiber can be selected from the group consisting of chopped carbon microfiber (CF), carbon nanofiber (CNF) and mixtures thereof. The amount of the polysulfone in the polyaryletherketone can range from about 20% to about 50% by weight, or from about 40% to about 50% by weight, or the amount of polysulfone in the polyaryletherketone can be about 45% by weight.

The amount of carbon microfiber present in the co-continuous immiscible polymer blend can range from about 5% to about 30% by weight, or about 15% to about 25% by weight, or the amount of carbon microfiber present in the co-continuous immiscible polymer blend can be about 20% by weight. The amount of carbon nanofiber in the co-continuous immiscible polymer blend can range from about 0.5% to about 5% by weight, or about 1% to about 4% by weight, or the amount of carbon nanofiber in the co-continuous immiscible polymer blend can be about 2.5% by weight. Further, the carbon nanofiber can be present in an amount from about 0.5% to about 2% by weight together with carbon microfiber in an amount from about 5% to about 15% by weight. The carbon nanofiber can be present in an amount of about 1% by weight together with carbon microfiber in an amount of about 10% by weight.

Another aspect of the invention is directed to a method of preparing a co-continuous immiscible polymer blend of a polysulfone and a polyaryletherketone reinforced with a carbon fiber, comprising the steps of a) preparing a carbon fiber-reinforced polysulfone, containing a reinforcing amount of carbon microfiber, carbon nanofiber, or a mixture thereof, and b) blending the carbon fiber-reinforced polysulfone with a polyaryletherketone, optionally reinforced with a reinforcing amount of carbon microfiber, carbon nanofiber, or a mixture thereof, in a blend ratio where the viscosity ratio of the polymer components is equivalent to the composition ratio at constant processing temperature and shear rate.

Compounding may be performed in a batch mixer or extruder that imparts repetitive high shear rates, elongational flow and distributive mixing. Longer mixing times provide enhanced nano-morphology of the immiscible polymer blend. Furthermore, the morphological properties are tunable by modification of the mixing process. In one embodiment, the shear rate is between about 150 and about 950 s$^{-1}$. In another embodiment, the shear rate is between about 250 and about 750 s$^{-1}$. In one embodiment the mixing is performed using a single screw extruder that includes one or more mixing elements that impart uniform shear flow in combination with extensional and distributive mixing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EMBODIMENTS

Figure 1:
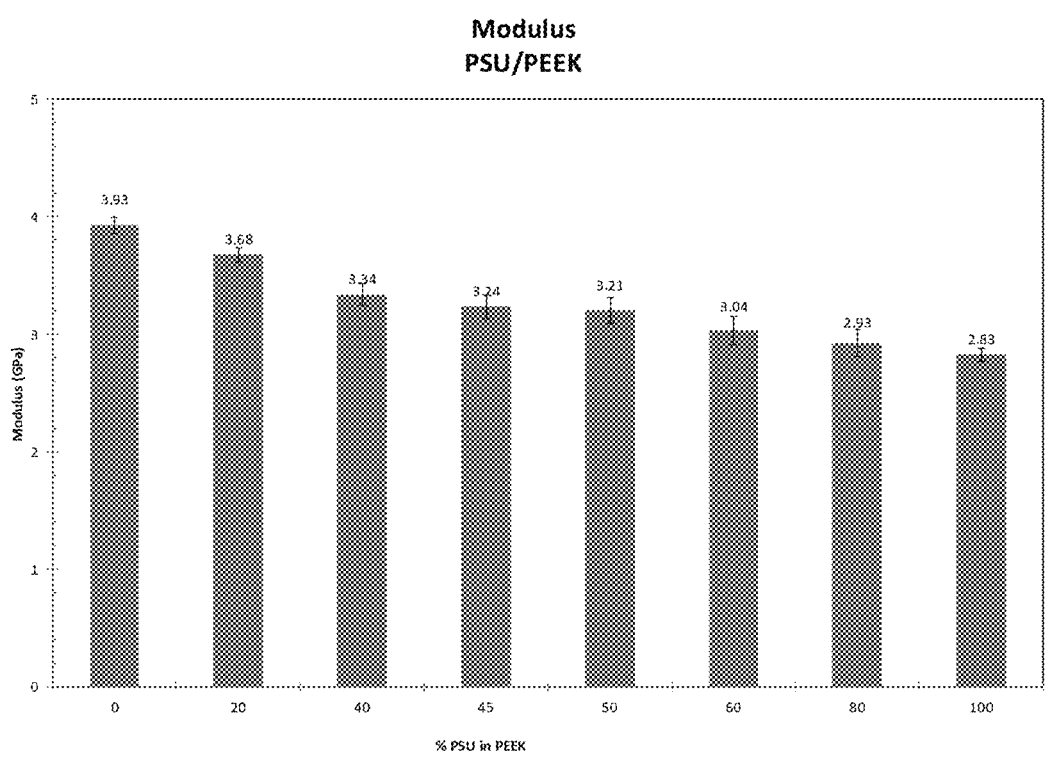
FIG. 1 shows modulus as a function of % PSU in PEEK.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention. The term "about" generally refers to plus or minus 10% of the indicated number. For example, "about 10%" may indicate a range of 9% to 11%, and "about 20" may mean from 18 to 22. Other meanings of "about" may be apparent from the context, such as rounding off, so, for example "about 1" may also mean from 0.5 to 1.4. Similarly, "about 0.2" may encompass the value 0.22.

One aspect of the invention is directed to a co-continuous immiscible polymer blend of a polysulfone and a polyaryletherketone reinforced with a carbon fiber. The polysulfone can have the structure

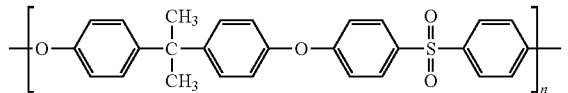

The polyaryletherketone can be polyetheretherketone (PEEK), having the structure

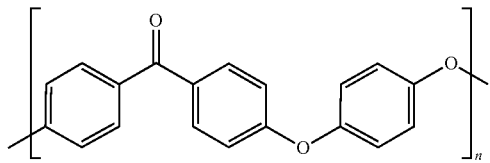

PEEK is a semi-crystalline, high temperature polyaryl etherketone and is processed at 360° C. PSU is an amorphous, high temperature polymer and is also processed at 360° C. PSU was targeted as the second polymer based on the high processing temperature restriction and its viscosity, which is lower than PEEK. In one embodiment, fiber self-alignment occurs during processing of the PSU/PEEK IMPB when the PSU phase is reinforced with CF and/or CNF prior to processing with PEEK. This provides enhanced mechanical and electrical properties over PEEK alone. In a further embodiment, the PEEK phase is also reinforced with CNF and/or CF and then processed with CNF and/or CF reinforced PSU. Other potential reinforcing agents include graphene, fiberglass (FG), natural fibers (NF), etc.

The carbon fiber can be selected from the group consisting of chopped carbon microfiber (CF), carbon nanofiber (CNF) and mixtures thereof. The amount of the polysulfone in the polyaryletherketone can range from about 20% to about 50% by weight, or from about 30% to about 50% by weight, or from about 40% to about 50% by weight, or the amount of the polysulfone in the polyaryletherketone can be about 45% by weight.

The amount of carbon microfiber present in the co-continuous immiscible polymer blend can range from about 5% to about 30% by weight, or about 10% to about 30%, or about 15% to about 25% by weight, or the amount of carbon microfiber present in the co-continuous immiscible polymer blend can be about 20% by weight. The amount of carbon nanofiber in the co-continuous immiscible polymer blend can range from about 0.5% to about 5% by weight, or about 1% to about 4% by weight, or about 2% to about 3%, or the amount of carbon nanofiber in the co-continuous immiscible polymer blend can be about 2.5% by weight. Further, the carbon nanofiber can be present in an amount from about 0.5% to about 2%, or about 1% to about 2% by weight together with carbon microfiber in an amount from about 5% to about 15%, or about 7% to about 13% by weight. The carbon nanofiber can be present in an amount of about 1% by weight together with carbon microfiber in an amount of about 10% by weight.

Another aspect of the invention is directed to a method of preparing a co-continuous immiscible polymer blend of a polysulfone and a polyaryletherketone reinforced with a carbon fiber, comprising the steps of a) preparing a carbon fiber-reinforced polysulfone, containing a reinforcing amount of carbon microfiber, carbon nanofiber, or a mixture thereof, and b) blending the carbon fiber-reinforced polysulfone with a polyaryletherketone, optionally reinforced with a reinforcing amount of carbon microfiber, carbon nanofiber, or a mixture thereof, in a blend ratio where the viscosity ratio of the components is equivalent to the composition ratio at constant processing temperature and shear rate.

Compounding may be performed in a batch mixer or extruder that imparts repetitive high shear rates, elongational flow and distributive mixing. Longer mixing times provide enhanced nano-morphology of the immiscible polymer blend. Furthermore, the morphological properties are tunable by modification of the mixing process. In one embodiment, the shear rate is between about 150 and about 950 s$^{-1}$. In another embodiment, the shear rate is between about 250 and about 750 s$^{-1}$. In one embodiment the mixing is performed using a single screw extruder that includes one or more mixing elements that impart uniform shear flow in combination with extensional and distributive mixing.

EXAMPLES

Example 1

An immiscible polymer blend of PSU/PEEK was processed and thermal, mechanical, and morphological properties investigated. Morphology analysis shows two very fine, distinct phases, indicating very good mixing during processing. The benefits of adding PSU to form a PSU/PEEK immiscible polymer blend include, (1) mechanical property enhancement in impact resistance and tensile % strain to yield, (2) processing aid, (3) cost reduction and (4) potential for self-alignment of carbon fibers and nanofibers within the total PEEK composite.

Examples of the thermoplastic resins and carbon fiber reinforcements used in the following examples are listed in Table 1.

TABLE 1

Materials

| Name | Cost $/lb | Product | Vendor | Description |
| --- | --- | --- | --- | --- |
| PEEK | 46 | KT-820 NT | Solvay Advanced Polymers | Semi-crystalline thermoplastic |
| PSU | 17 | Udel P-1700 NT 11 | Solvay Advanced Polymers | Amorphous thermoplastic |
| CNF | 239 | 19-XT-LHT | Pyrograf Products | Nano-scale reinforcement |
| CF | 15 | A HT C723 6 mm | Toho Tenax America | Micro-scale reinforcement |

The processing equipment employed included, a Negri Boss V55-200 Injection Molding machine disclosed in U.S. Pat. No. 9,533,432, the disclosure of which is incorporated herein by reference, and a Randcastle single screw extruder (SSE) with multiple AFEM elements used for pre-compounding CNF and/or CF into the PSU phase. Prior to each processing step, PSU, PSU composites, PEEK and PEEK composites were dried at about 160° C. for more than 12 hours.

The PSU/PEEK samples were dry-blended and directly injection molded. The molder was operated at 100 RPMs, which imparts a maximum shear rate of 315 s$^{-1}$. The viscosity of PSU and PEEK at a temperature and shear rate of 360° C. and 315 s$^{-1}$ is 619.9 and 750.4 Pa-s, respectively. The dual phase, co-continuous structure is predicted to occur when the viscosity ratio of the components is equivalent to the composition ratio at a constant processing temperature and shear rate. The co-continuous region of the PSU/PEEK IMPB is predicted to occur at 45/55% PSU/PEEK. Thus, the PSU/PEEK IMPB was prepared at 0, 20, 40, 45, 50, 60, 80, and 100 weight % PSU in PEEK.

CNF-PSU, CF-PSU, and CNF-CF-PSU were melt-blended using the SSE, ground, dry-blended with PEEK, and injection molded at 0, 20, 40, 45, 50, 60, 80, and 100 weight % PSU composite in PEEK. The SSE was operated at 180 RPM and 342° C. while preparing CNF, CF, and CNF-CF/PSU composites.

The CNF-CF-PEEK composite was prepared in two processing steps. First, 20% CF was melt-blended with PEEK using Randcastle SSE at 180 RPM and 360° C. Second, 2.5% CNF was melt-blended with the 20CF-PEEK composite using the injection molding machine at 100 RPM and 360° C. In this case, the injection molding machine was operated as an extruder to produce extrudate for grinding.

Representative materials systems investigated for this invention are listed in Table 2. The composition ratios were the same for each composite at 0, 20, 40, 45, 50, 60, 80, and 100 weight % of the PSU or PSU reinforced composite within PEEK or the PEEK composite.

TABLE 2

Exemplary materials systems

| No. | Sample Name | Description |
|---|---|---|
| 1 | PSU/PEEK | Immiscible polymer blend of PSU and PEEK |
| 2 | PSU Composites | PSU reinforced with CNF, CF, or CNF + CF |
| 3 | (CNF-PSU)/PEEK | (2.5% CNF reinforced PSU)/PEEK |
| 4 | (CF-PSU)/PEEK | (20% CF reinforced PSU)/PEEK |
| 5 | (CNF-CF-PSU)/PEEK | (1% CNF and 10% CF reinforced PSU)/PEEK |
| 6 | (CNF-CF-PSU)/ (CNF-CF-PEEK) | (2.5% CNF and 20% CF reinforced PSU)/(2.5% CNF and 20% CF reinforced PEEK) |

Example 2. Characterization of IMPBs

The thermal and mechanical properties, as well as the morphological structure of the PSU/PEEK IMPB were determined. The thermal properties were characterized using a TA Instruments Q1000 DSC operated in standard heat/cool/reheat mode over a temperature range of 20-400° C. at 10° C./min. The mechanical properties were determined in uniaxial tension using a MTS Q Test/25 Universal Testing Machine, according to ASTM D638. The notched Izod impact resistance was determined using an Instron Dynatup POE 2000 Impact Tester, according to ASTM D256. The average impact velocity was 3.46 m/s. Impact resistance is calculated as the total energy absorbed upon impact divided by the specimen thickness (approximately 3.3 mm). The morphology analysis was completed using a Zeiss Field Emission Scanning Electron Microscope (FESEM) on specimens fractured at liquid nitrogen temperatures with a 5-6 nm gold coating applied to the fracture surface. The fracture surface is perpendicular to the extrusion direction.

Example 3. PSU Reinforced with CNF and CF

The carbon reinforced PSU composites were melt-blended using a Randcastle single screw extruder of Example 2 followed by injection molding, using the Negri Bossi injection molding machine and are listed in Table 3. The 2.5 CNF-20CF-PSU composite was achieved slightly differently than the others. The first melt-blending step using the Randcastle single screw extruder incorporated either the 2.5 CNF into the PSU or the 20 CF into the PSU, followed by a second processing step using the injection molding machine to add 20 CF to 2.5CNF-PSU or 2.5CNF to 20CF-PSU. All percentages were measured as weight percentages. Tensile and impact specimens were molded and tested according to ASTM D638 and D256, respectively. The tensile modulus, strength at yield and break, % strain at yield, and % strain at break appear in FIG. 25, FIG. 26, FIG. 27 and FIG. 28, respectively.

TABLE 3

Description of the carbon-reinforced PSU composites

| Label | Description |
|---|---|
| 20CF-PSU | 20% CF melt-blended with 80% PSU |
| 2.5CNF-10CF-PSU | 2.5% CNF and 10% CF melt-blended with 77.5% PSU |
| 1CNF-10CF-PSU | 1% CNF and 10% CNF melt-blended with 89% PSU |
| 2.5CNF-PSU | 2.5% CNF melt-blended with 87.5% PSU |

The specific modulus and strength of aluminum 6061 is 25.9 GPa and 115 MPa, respectively. The specific yield strength, fracture strength, and modulus for these PSU composites are shown in Table 4. For the 20CF-PSU composite, the specific strength is over 100 MPa, and the specific modulus is almost 10 GPa.

TABLE 4

Specific tensile properties of PSU composites

| Composite or Element | Specific Yield Strength (MPa) | Specific Fracture Strength (MPa) | Specific Modulus (GPa) |
|---|---|---|---|
| Aluminum 6061 | | 115 (ultimate) | 25 |
| 20CF-PSU | 101 | 101 | 9.9 |
| 2.5CNF-10CF-PSU | 102 | 102 | 9.5 |
| 1CNF-10CF-PSU | 81 | 81 | 5.4 |
| 2.5CNF | 55 | 55 | 2.4 |
| PSU | 59 | 49 | 2.3 |

Figure 2:
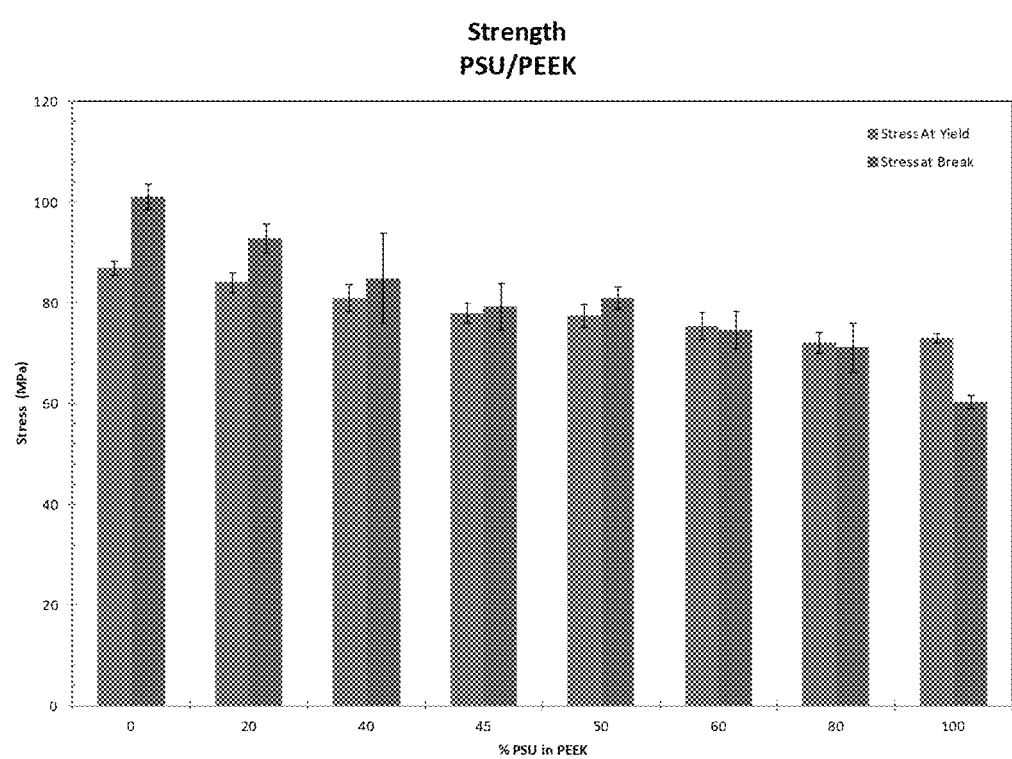
FIG. 2 shows stress at yield and stress at break as a function of % PSU in PEEK.
Figure 3:
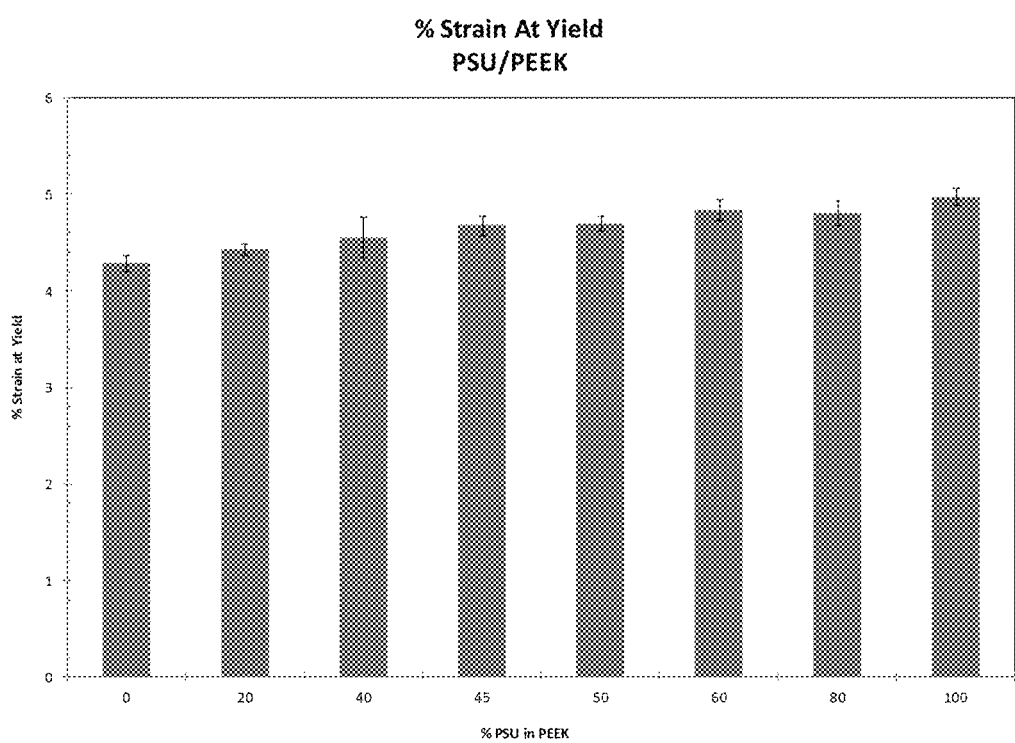
FIG. 3 shows % strain at yield as a function of % PSU in PEEK.
Figure 4:
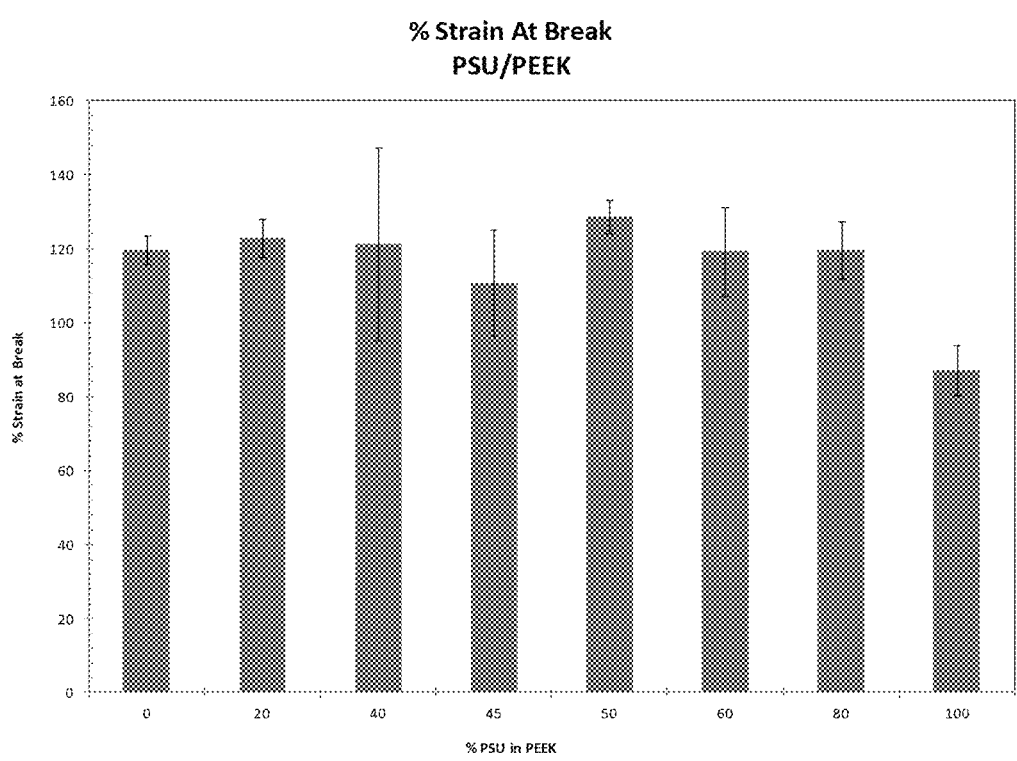
FIG. 4 shows % strain at break as a function of % PSU in PEEK.
Figure 5:
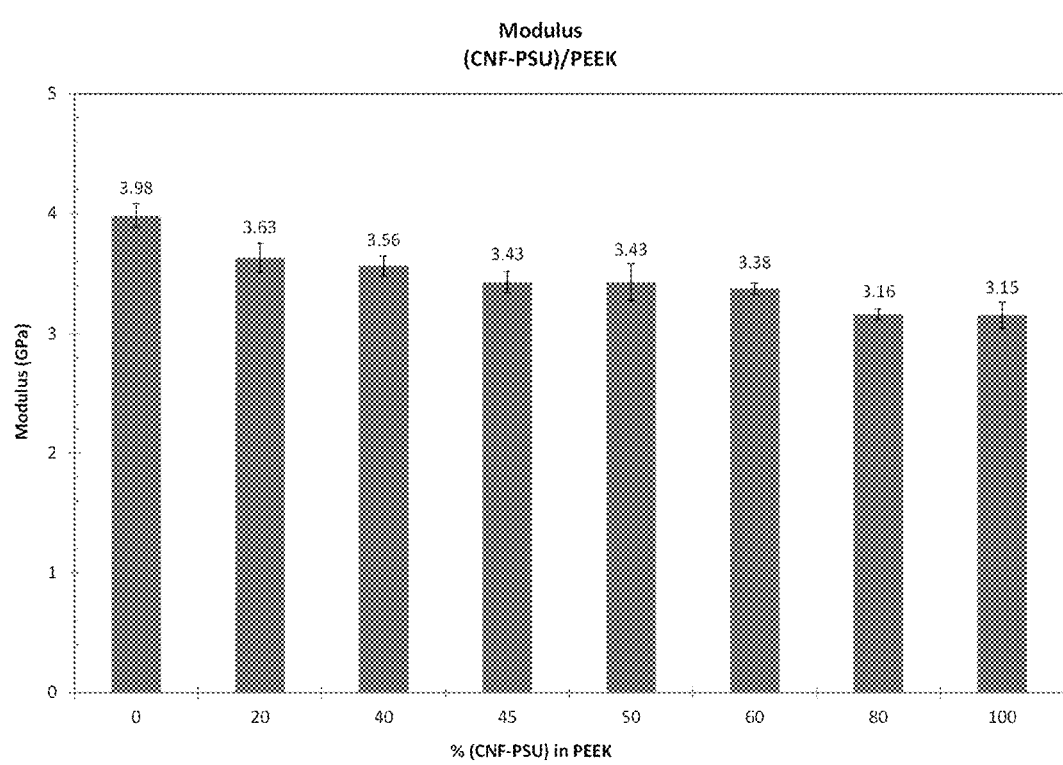
FIG. 5 shows modulus as a function of % (CNF-PSU) in PEEK.
Figure 6:
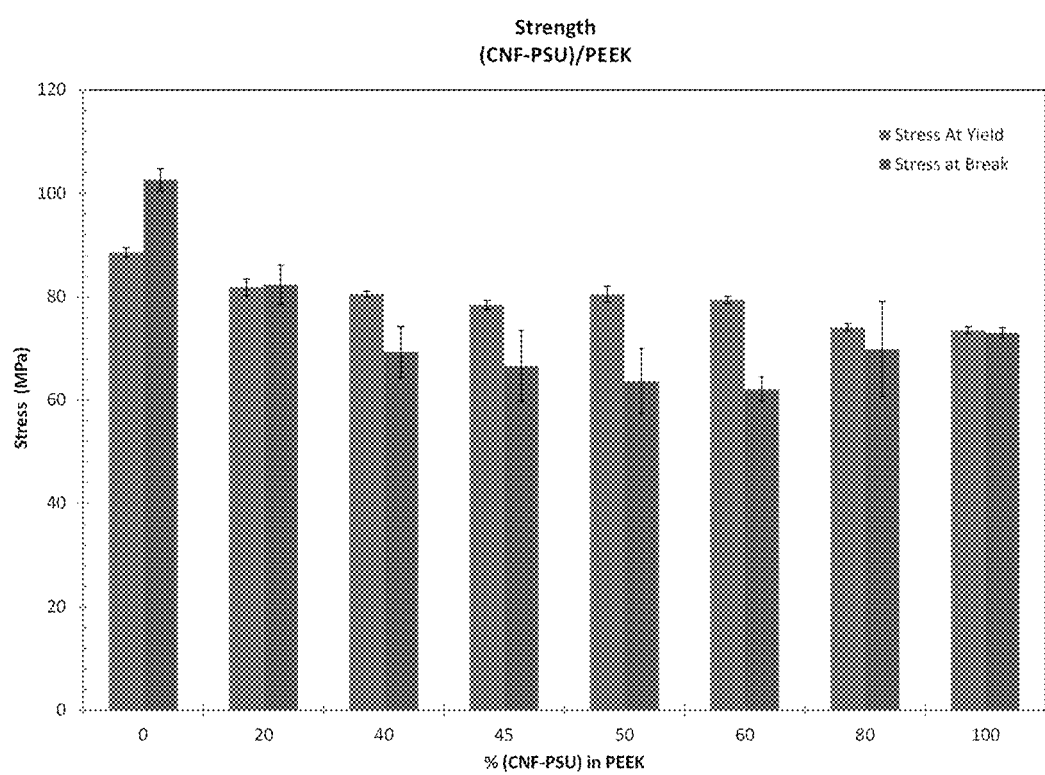
FIG. 6 shows stress at yield and stress at break as a function of % (CNF-PSU) in PEEK.
Figure 7:
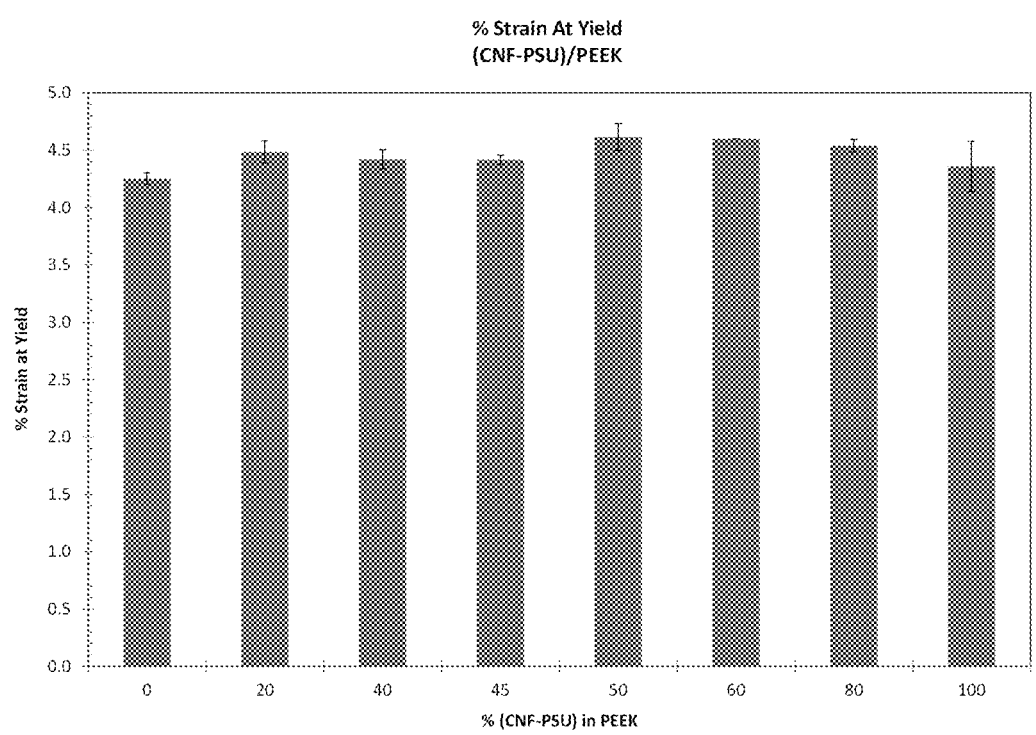
FIG. 7 shows % strain at yield as a function of % (CNF-PSU) in PEEK.
Figure 8:
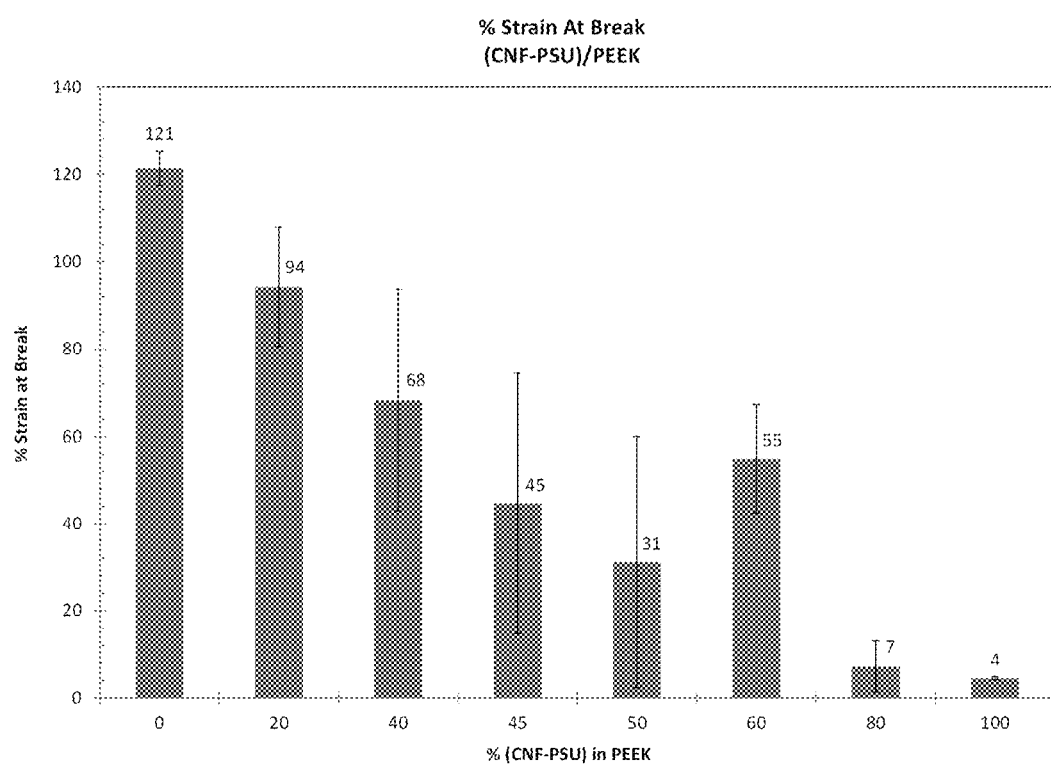
FIG. 8 shows % strain at break as a function of % (CNF-PSU) in PEEK.
Figure 9:
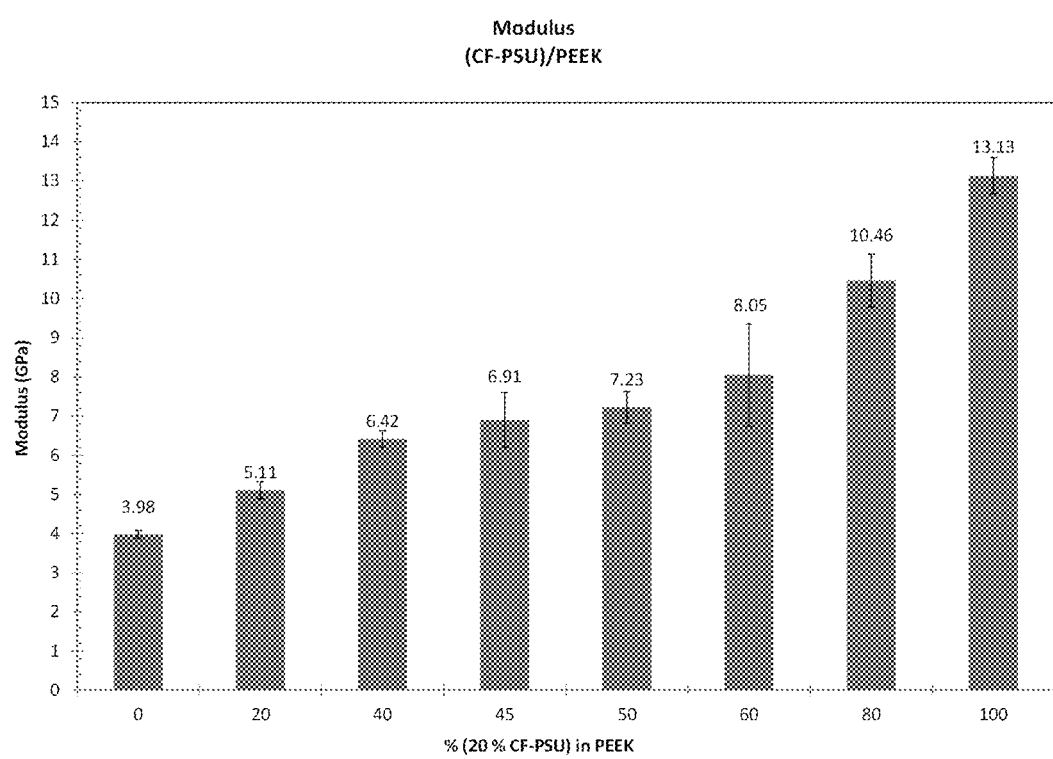
FIG. 9 shows modulus as a function of % (CF-PSU) in PEEK.
Figure 10:
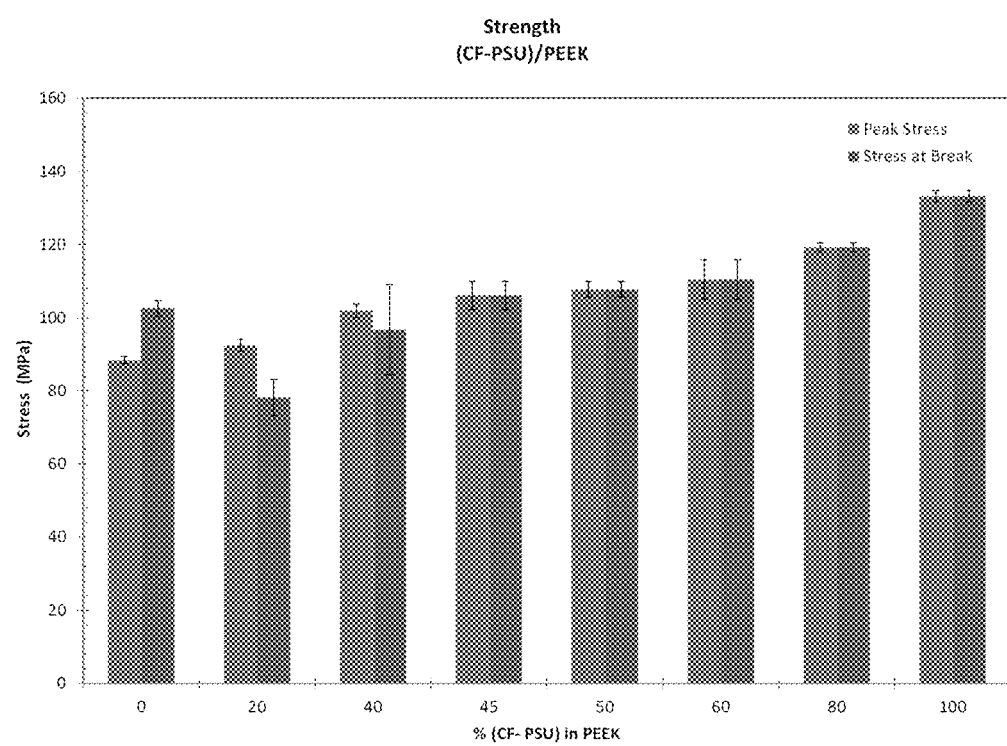
FIG. 10 shows stress at yield and stress at break as a function of % (CF-PSU) in PEEK.
Figure 11:
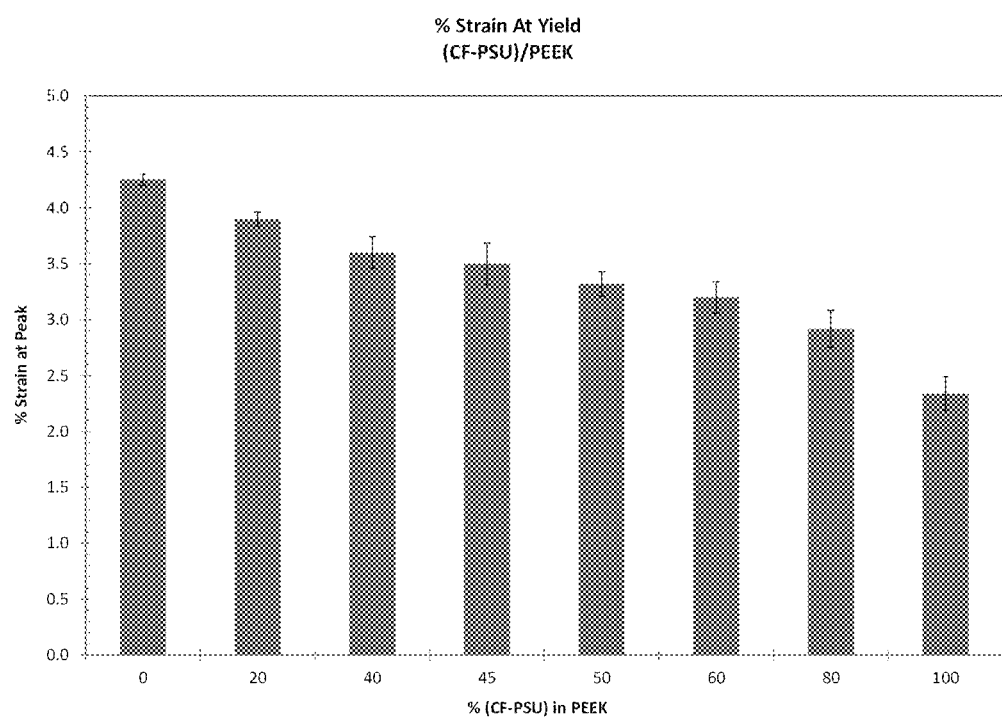
FIG. 11 shows % strain at yield as a function of % (CF-PSU) in PEEK.
Figure 12:
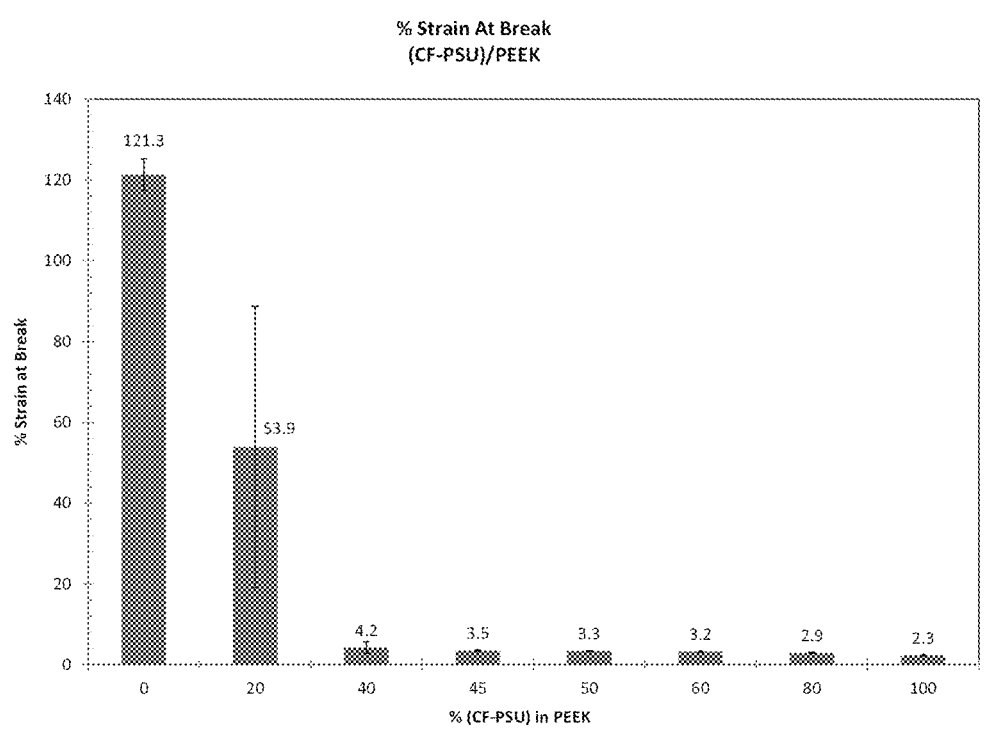
FIG. 12 shows % strain at break as a function of % (CF-PSU) in PEEK.

Results
Tensile Properties
  PSU/PEEK
    The mechanical properties in uniaxial tension were determined for all compositions of the PSU/PEEK IMPB. The stress-strain curves rise quickly to a peak and yield between 4% and 5% strain, after which, the stress decreases dramatically, plateaus, and then rises again. The average modulus per PSU/PEEK composition is displayed in FIG. 1. The stress at yield and stress at break per PSU/PEEK composition is displayed in FIG. 2. The % strain at peak and % strain at break are displayed in FIG. 3 and FIG. 4, respectively.
  (CNF-PSU)/PEEK
    The mechanical properties in uniaxial tension were determined for all compositions of the (CNF-PSU)/PEEK composite. The stress-strain curves rise quickly to a peak and yield between 4% and 5% strain. After yielding for 0%, 20%, and 40% (CNF-PSU) in PEEK, the stress decreases dramatically and plateaus, and then rises again before fracturing at greater than 70% strain. After yielding for 45, 50, and 60% (CNF-PSU) in PEEK, the stress decreases dramatically and plateaus before fracture between 40-65% strain. After yielding for 80% and 100% (CNF-PSU) in PEEK, the stress decreases dramatically and fracture occurs at less than 5% strain. The average modulus per (CNF-PSU)/PEEK composition is displayed in FIG. 5. The stress at yield and stress at break per (CNF-PSU)/PEEK composition are displayed in FIG. 6. The % strain at peak and % strain at break are displayed in FIG. 7 and FIG. 8, respectively.
  (CF-PSU)/PEEK
    The mechanical properties in uniaxial tension were determined for all compositions of the (CF-PSU)/PEEK composite. The stress-strain curves of the 20/80% (CNF-PSU)/PEEK sample behave similarly to the 100% PEEK sample but does fracture under 60% strain. For the remaining compositions, the stress-strain curves rise quickly to a peak and fracture at less than 5% strain. The average modulus per (CF-PSU)/PEEK composition is displayed in FIG. 9. The stress at yield and stress at break per (CF-PSU)/PEEK composition are displayed in FIG. 10. The % strain at peak and % strain at break are displayed in FIG. 11 and FIG. 12, respectively.

(CNF-CF-PSU)/PEEK

Figure 13:
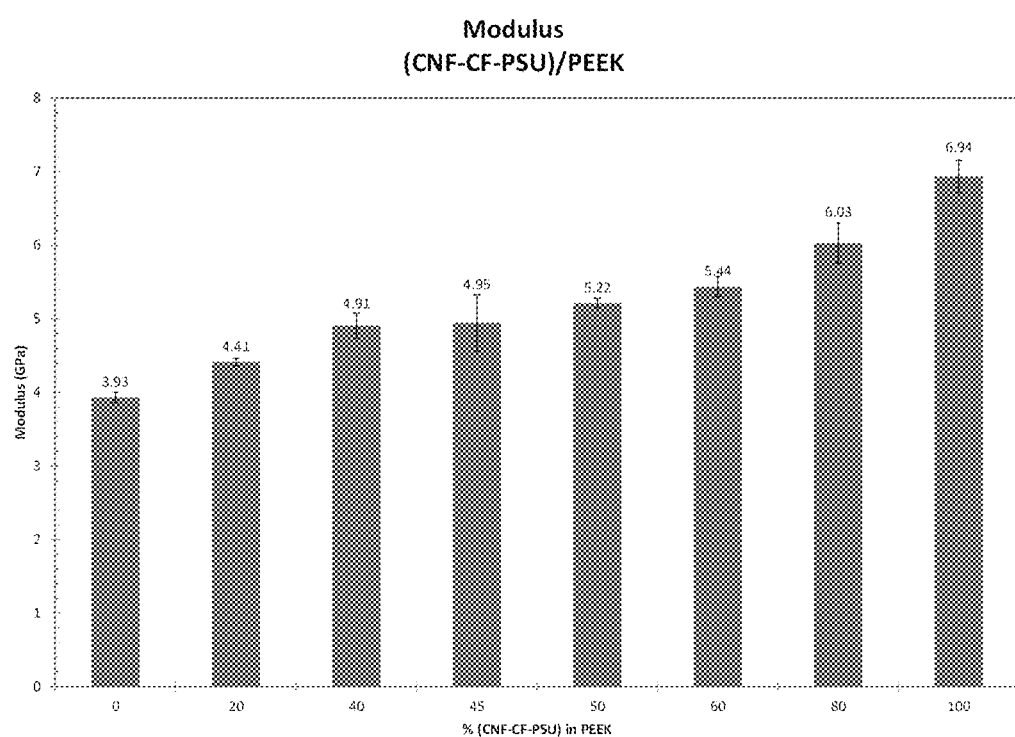
FIG. 13 shows modulus as a function of % (CNF-CF-PSU) in PEEK.
Figure 14:
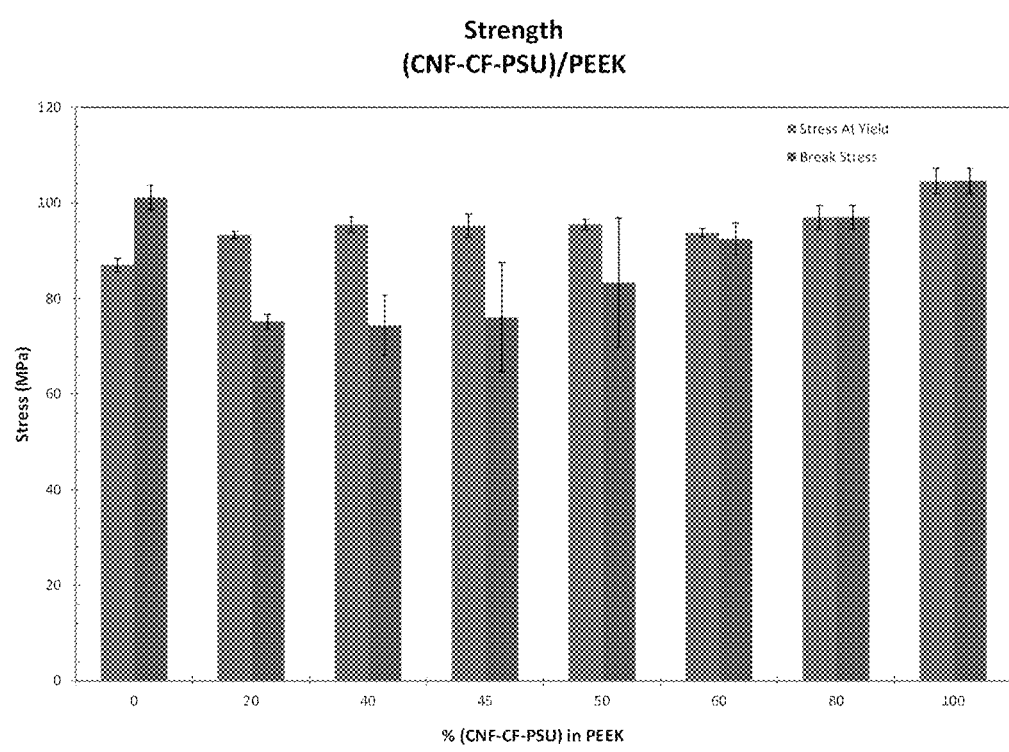
FIG. 14 shows stress at yield and stress at break as a function of % (CNF-CF-PSU) in PEEK.
Figure 15:
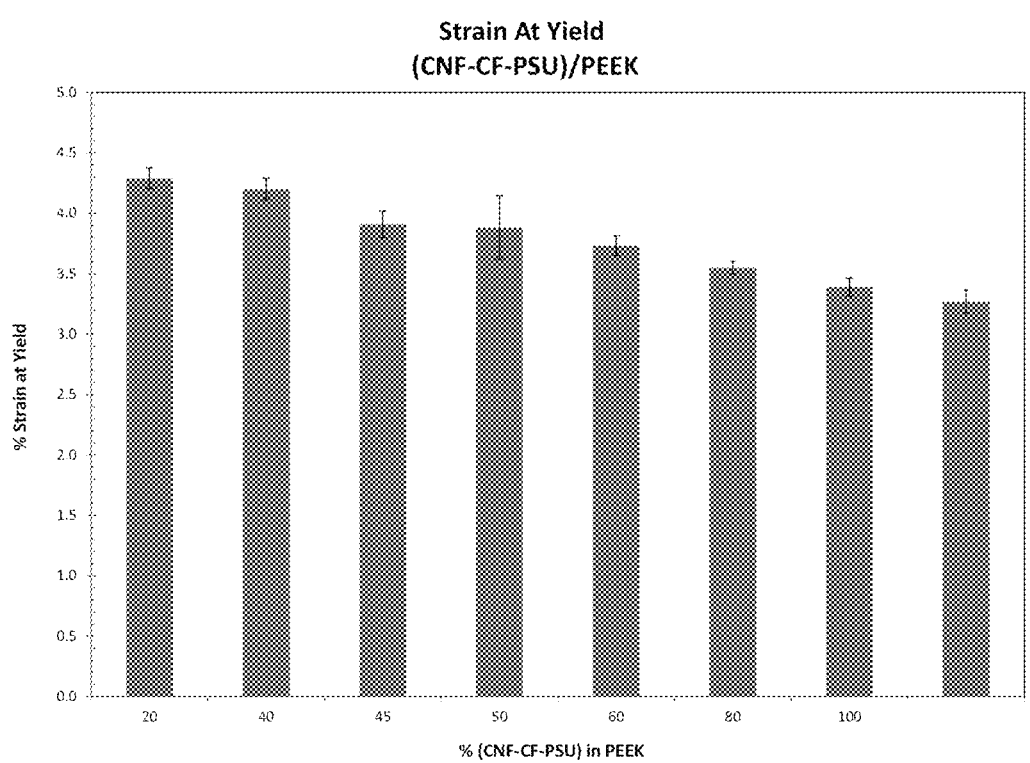
FIG. 15 shows % strain at yield as a function of % (CNF-CF-PSU) in PEEK.
Figure 16:
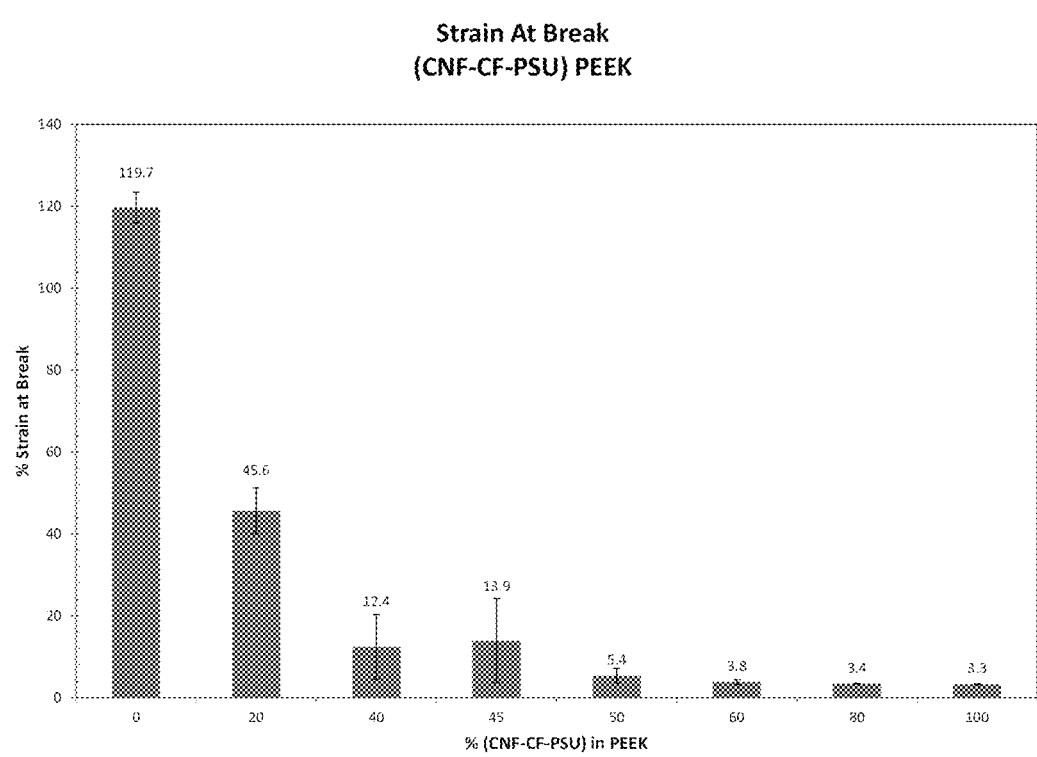
FIG. 16 shows % strain at break as a function of % (CNF-CF-PSU) in PEEK.

The mechanical properties in uniaxial tension were determined for all compositions of the (CNF-CF-PSU)/PEEK composite. The stress-strain curves of the 20/80% (CNF-CF-PSU)/PEEK sample behave similarly to the 100% PEEK sample but does fracture under 50% strain. The 100% (CNF-CF-PSU) sample attains the highest strength value but fractures at 3.3% strain. The remaining compositions follow the stress-strain behavior of PEEK, except that they fracture between 3.4-14% strain. The average modulus per (CNF-CF-PSU)/PEEK composition is displayed in FIG. 13. The stress at yield and stress at break per (CNF-CF-PSU)/PEEK composition are displayed in FIG. 14. The % strain at peak and % strain at break are displayed in FIG. 15 and FIG. 16, respectively.

(CNF-CF-PSU)/(CNF-CF-PEEK)

Figure 17:
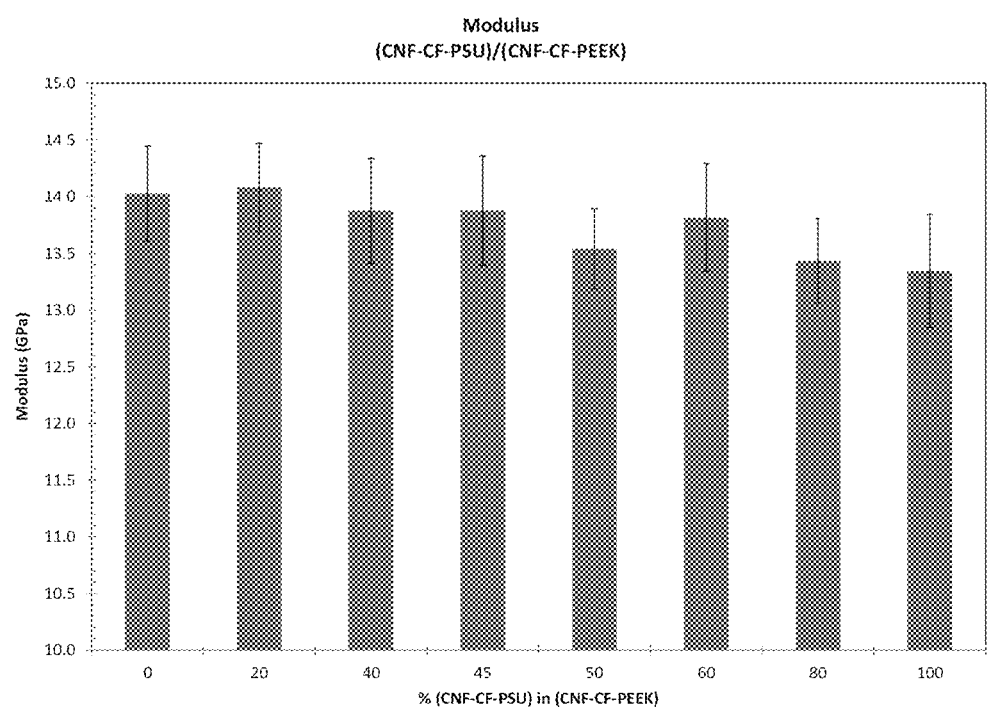
FIG. 17 shows modulus as a function of % (CNF-CF-PSU) in (CNF-CF-PEEK).
Figure 18:
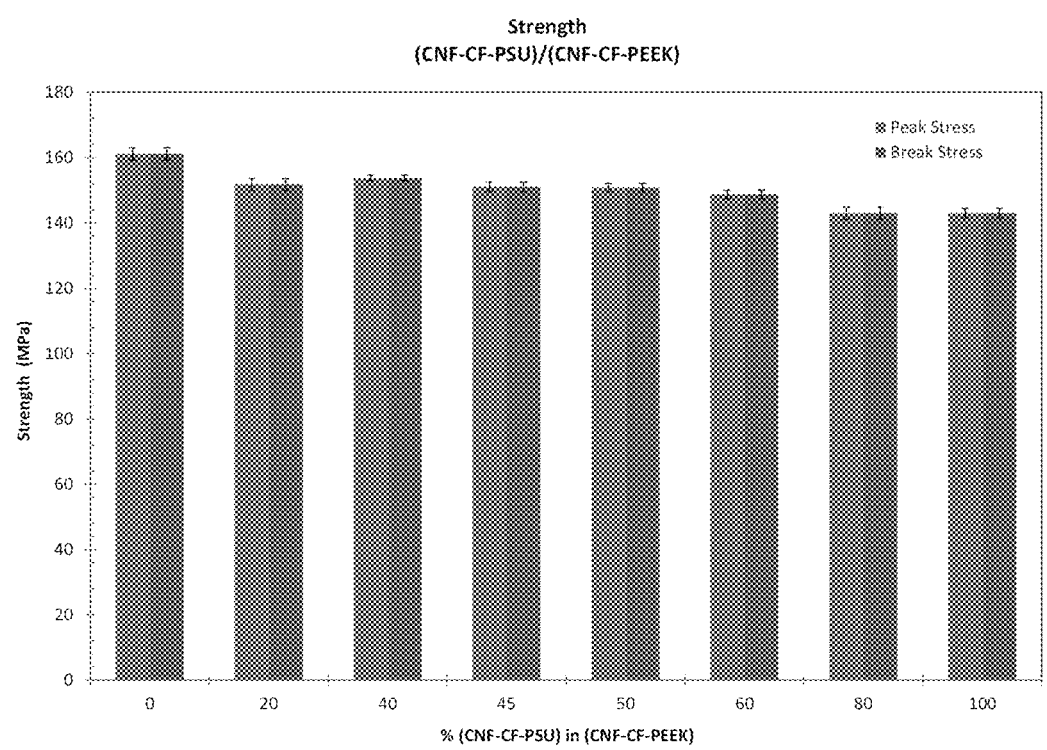
FIG. 18 shows stress at yield and stress at break as a function of % (CNF-CF-PSU) in (CNF-CF-PEEK).
Figure 19:
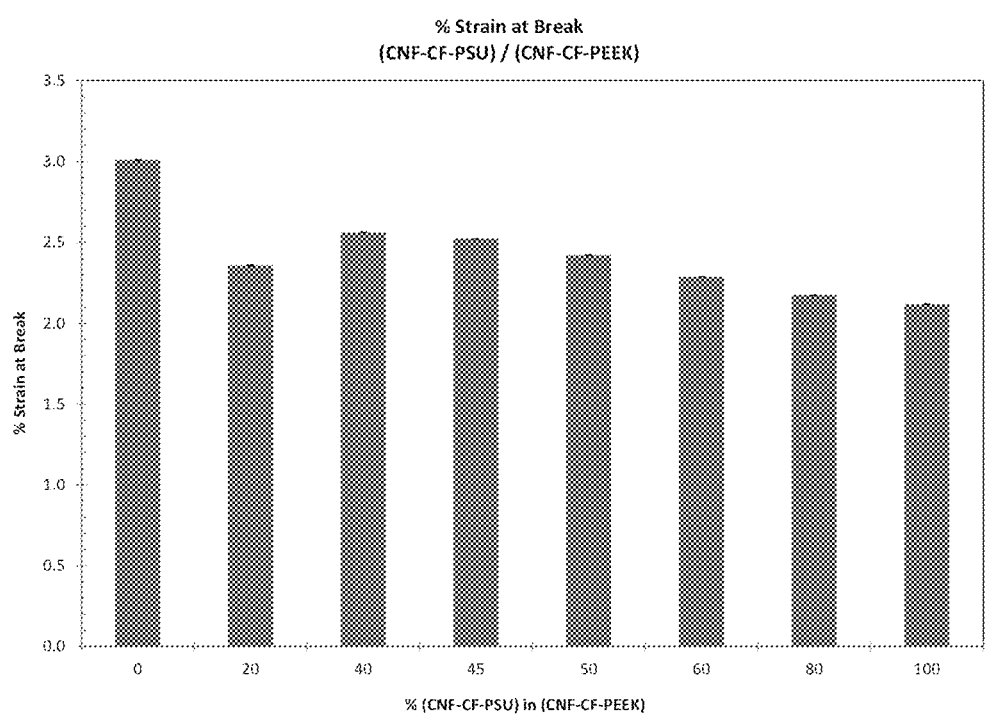
FIG. 19 shows % strain at break as a function of % (CNF-CF-PSU) in (CNF-CF-PEEK).

The mechanical properties in uniaxial tension were determined for all compositions of the (CNF-CF-PSU)/(CNF-CF-PEEK) composite. The stress-strain curves rise quickly to between 150 and 160 MPa and fracture between 2.2% and 3% strain. The average modulus per (CNF-CF-PSU)/(CNF-CF-PEEK) composition is displayed in FIG. 17. The stress at yield and stress at break per (CNF-CF-PSU)/(CNF-CF-PEEK) composition are displayed in FIG. 18. The % strain at break is displayed in FIG. 19.

Impact Properties

PSU/PEEK

Figure 20:
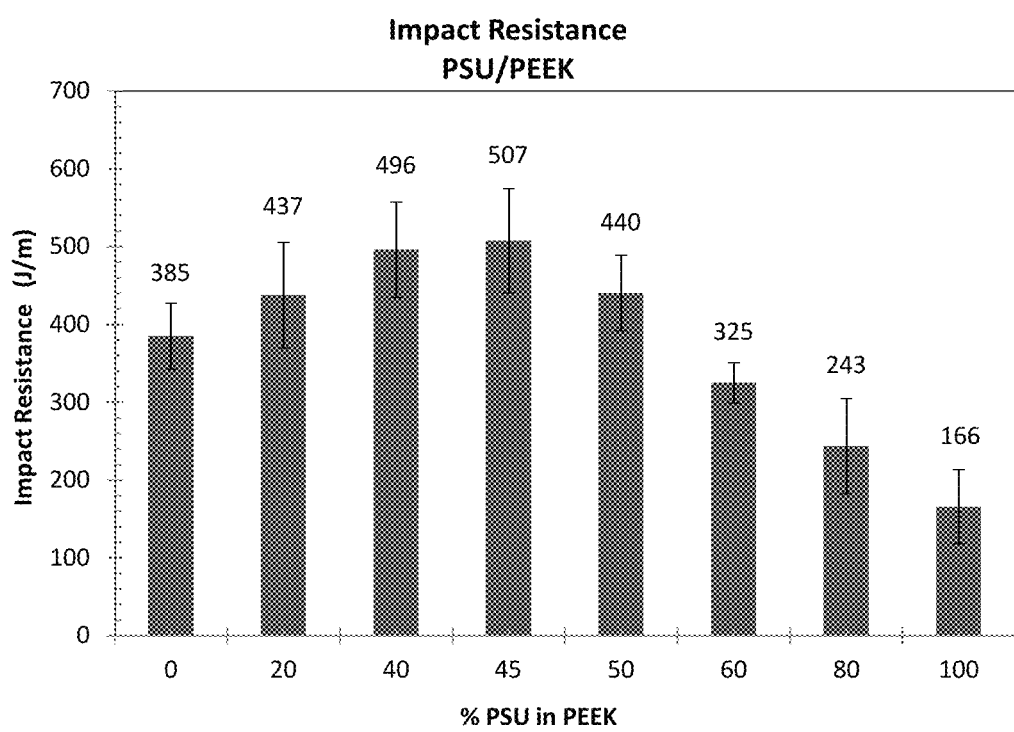
FIG. 20 shows Izod impact resistance of the PSU/PEEK IMPB as a function of wt % PSU in PEEK.

The Izod impact resistance was determined for all compositions of the PSU/PEEK IMPB and is displayed in FIG. 20. All of the reported specimens experienced a complete break (C). The impact resistance of PEEK is 385 J/m. With increasing PSU content, the impact resistance increases to a maximum (507 J/m) at the dual phase, co-continuous structure of 45/55 wt % PSU/PEEK. This is attributed to the fine morphology of PSU and PEEK forming an interpenetra-ting network and large amount of interfacial area. The crack loses energy as it attempts to propa-gate through a tortuous path of PSU and PEEK domains, as well as a high concentration of PSU-PEEK interfaces. After the phase inversion in which PSU becomes the primary matrix, the impact resistance decreases toward the PSU impact resistance value of 166 J/m. Please note that the impact resistance for neat PEEK and PSU are higher than reported by the supplier, Solvay Advanced Polymers, as 91 J/m and 69 J/m, respectively. This is attributed to the unique, one-step processing method that provides high compounding and part fabrication in one processing step. The geometry of the mixing elements enables elongational mixing to produce an almost pure shear mixing environment that has an effect on even a neat polymer.

(CNF-PSU)/PEEK

Figure 21:
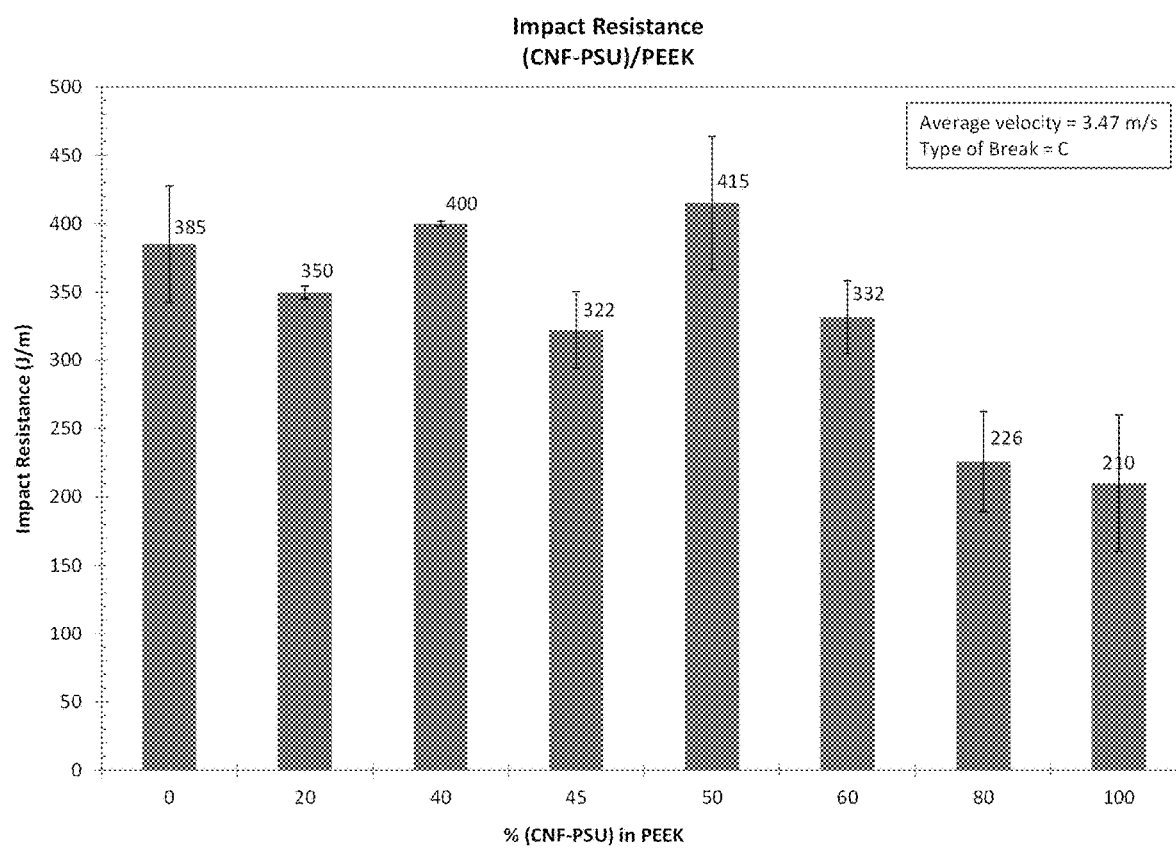
FIG. 21 shows Izod impact resistance of the (CNF-PSU)/PEEK composite IMPB as a function of wt % (CNF-PSU) in PEEK.

The Izod impact resistance was determined for all compositions of the (CNF-PSU)/PEEK composite IMPB and is displayed in FIG. 21. The reported specimens resulted in a complete break (C). The impact resistance of PEEK is 385 J/m. With increasing (CNF-PSU) content, the impact resistance increases to a maximum (415 J/m) at 50/50 wt % (CNF-PSU)/PEEK. The dual-phase, co-continuous morphology may have shifted to the 50/50% composition due to the introduction of CNF in the PSU phase. After the phase inversion in which (CNF-PSU) becomes the primary matrix, the impact resistance decreases to 210 J/m.

(CF-PSU)/PEEK

Figure 22:
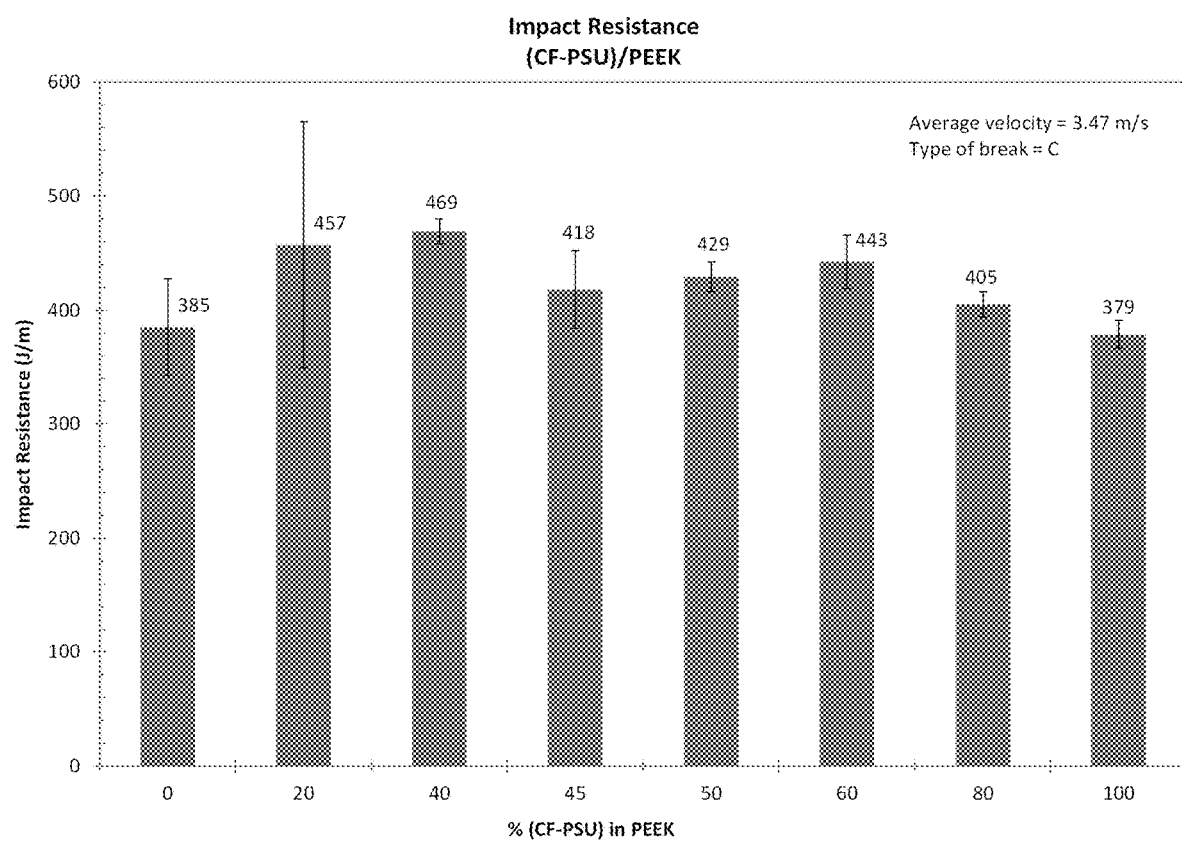
FIG. 22 shows Izod impact resistance of the (CF-PSU)/PEEK composite IMPB as a function of wt % (CF-PSU) in PEEK.

The Izod impact resistance was determined for all compositions of the (CF-PSU)/PEEK composite IMPB and is displayed in FIG. 22. All of the reported specimens experienced a complete break (C). The impact resistance of PEEK is 385 J/m. With increasing (CF-PSU) content, the impact resistance increases to a maximum (469 J/m) at 40/60 wt % PSU/PEEK. After the phase inversion in which (CF-PSU) becomes the primary matrix, the impact resistance decreases toward the (CNF-PSU) impact resistance value of 379 J/m. Note that the impact resistance of neat PSU is much lower than (CNF-PSU) at only 166 J/m.

(CNF-CF-PSU)/PEEK

Figure 23:
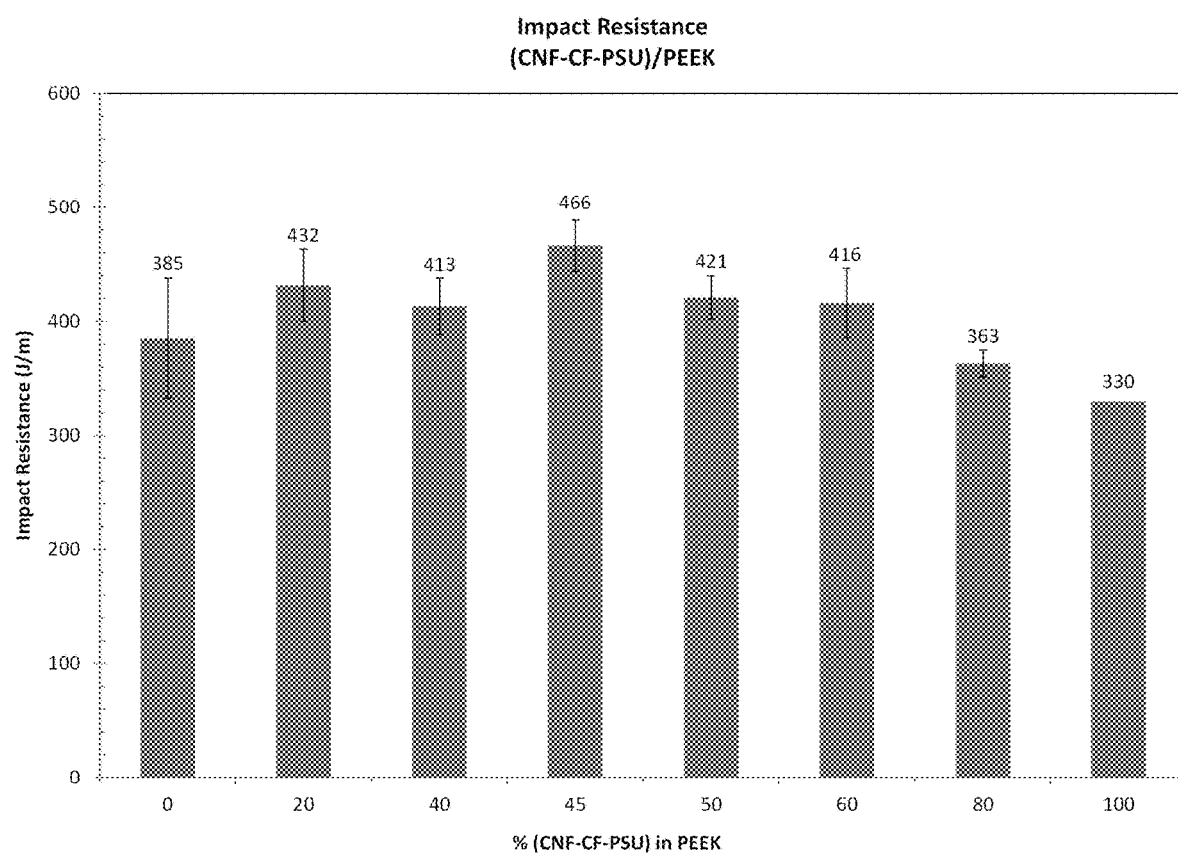
FIG. 23 shows Izod impact resistance of the (CNF-CF-PSU)/PEEK composite IMPB as a function of wt % (CNF-CF-PSU) in PEEK.

The Izod impact resistance was determined for all compositions of the (CNF-CF-PSU)/PEEK composite IMPB and is displayed in FIG. 23. All of the reported specimens experienced a complete break (C). The impact resistance of PEEK is 385 J/m. With increasing (CNF-CF-PSU) content, the impact resistance increases to a maximum of 466 J/m at 45/55 wt % PSU/PEEK. After the phase inversion in which (CNF-CF-PSU) becomes the primary matrix, the impact resistance decreases to 330 J/m. Note again that the impact resistance of neat PSU is 166 J/m, significantly lower than this PSU composite of (CNF-CF-PSU).

(CNF-CF-PSU)/(CNF-CF-PEEK)

Figure 24:
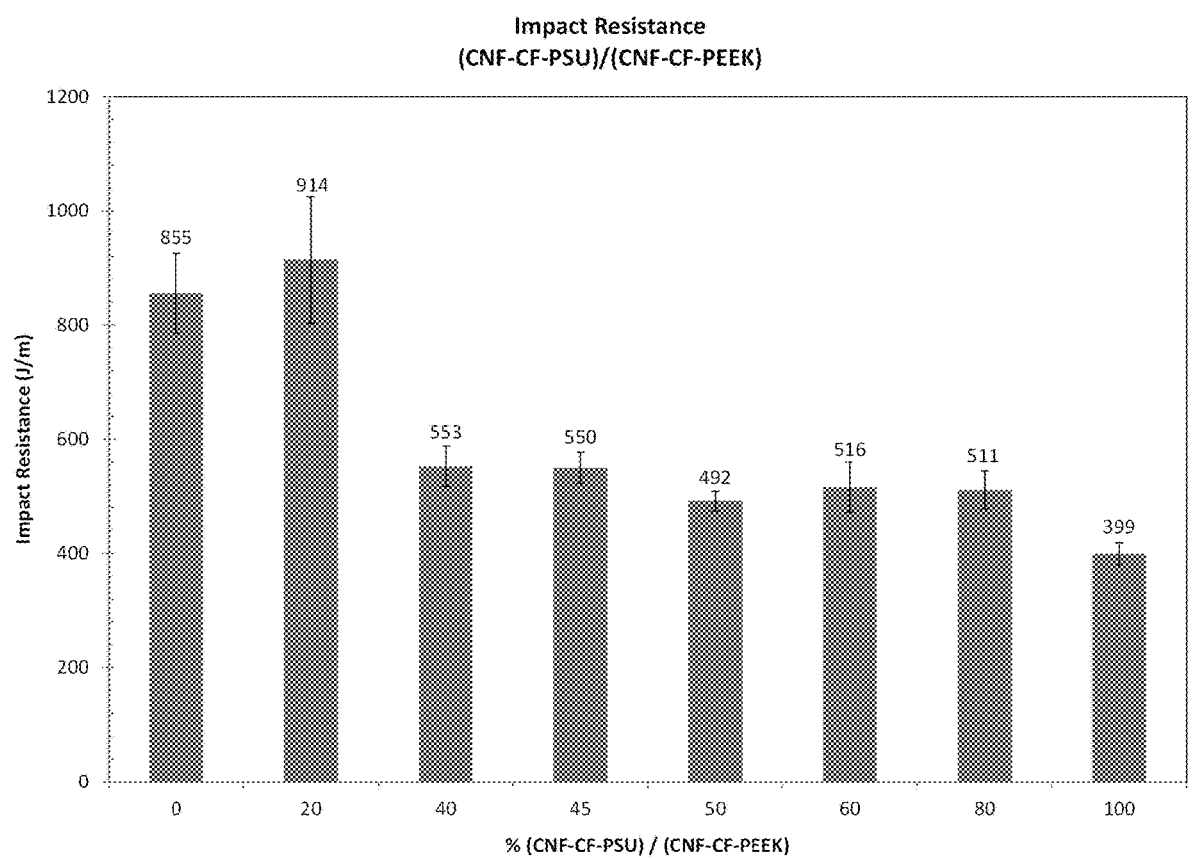
FIG. 24 shows Izod impact resistance of the (CNF-CF-PSU)/(CNF-CF-PEEK) composite IMPB as a function of wt % (CNF-CF-PSU) in (CNF-CF-PEEK).
Figure 25:
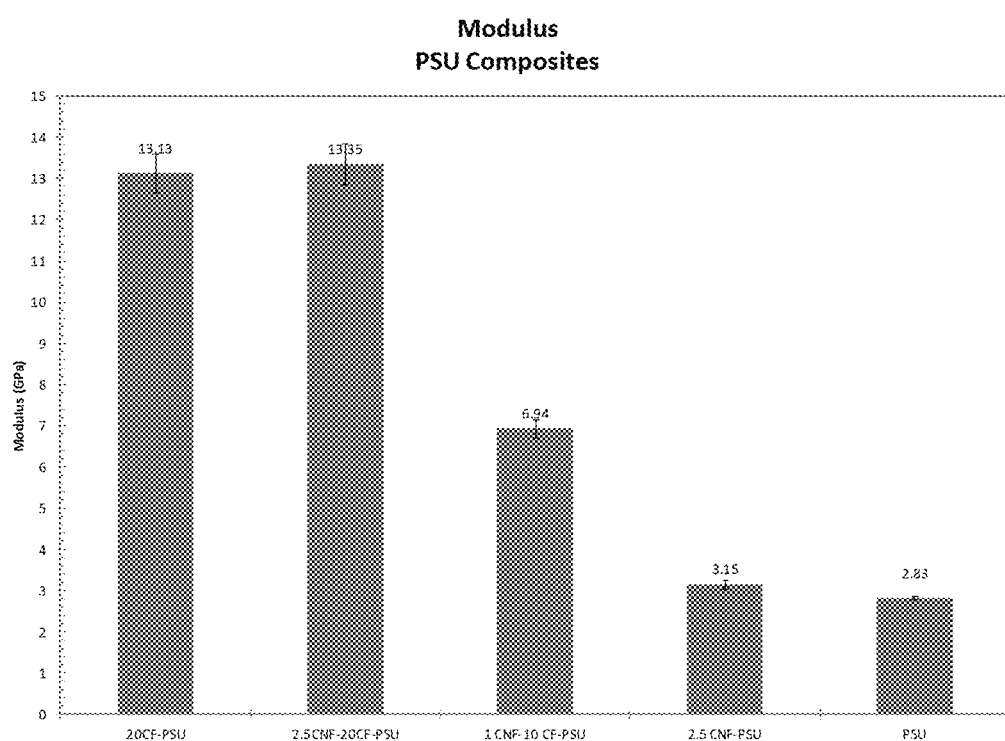
FIG. 25 shows tensile modulus for PSU and PSU composites.
Figure 26:
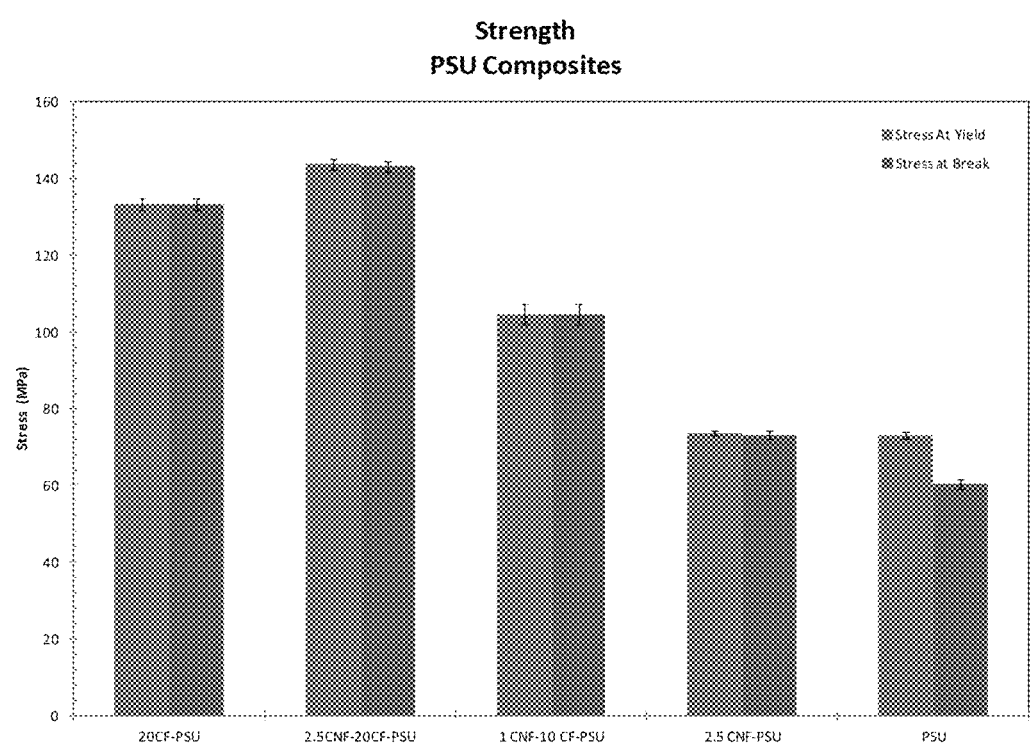
FIG. 26 shows tensile stress at yield and break for PSU and PSU composites.
Figure 27:
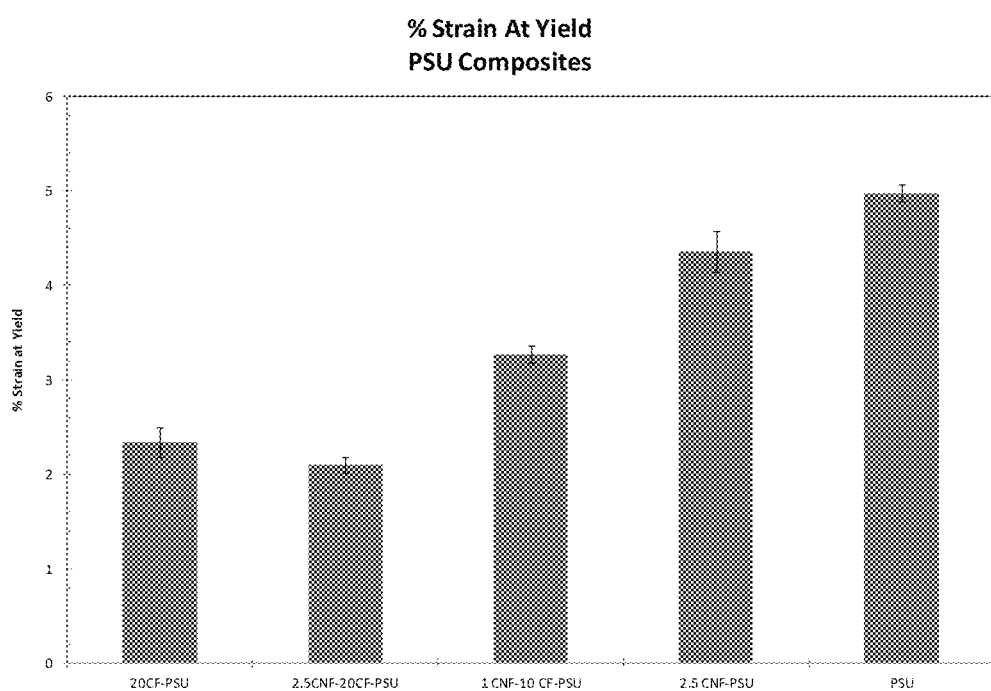
FIG. 27 shows tensile % strain at yield for PSU and PSU composites.
Figure 28:
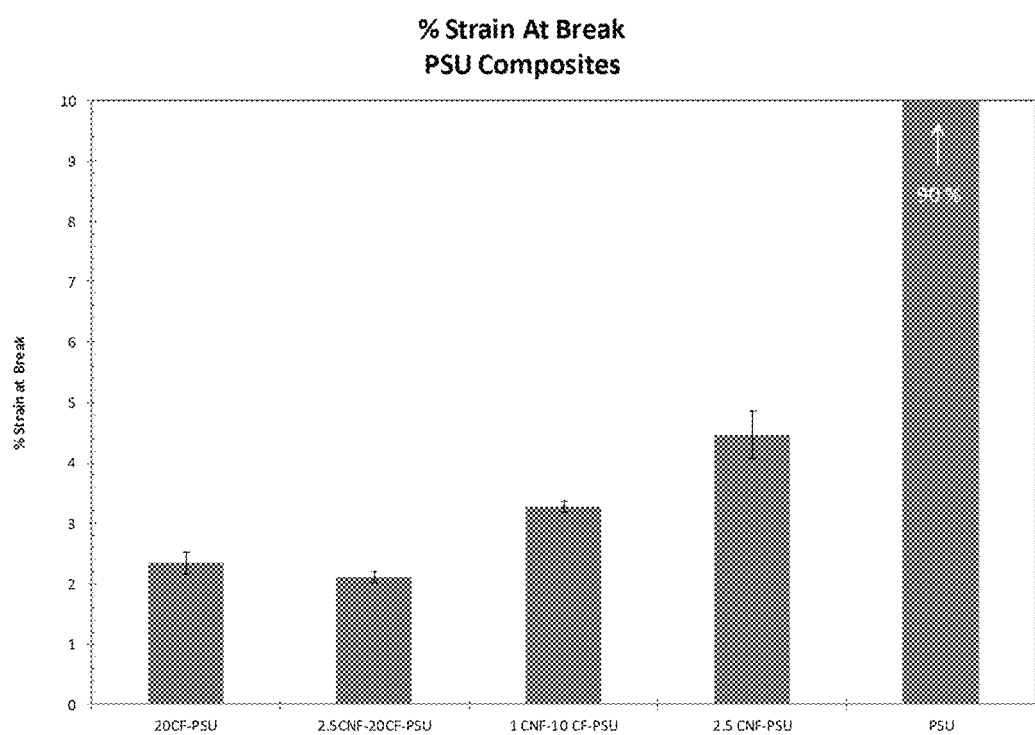
FIG. 28 shows tensile % strain at break for PSU and PSU composites.

The Izod impact resistance was determined for all compositions of the (CNF-CF-PSU)/(CNF-CF-PEEK) composite IMPB and is displayed in FIG. 24. All of the reported specimens experienced a complete break (C). The impact resistance of (CNF-CF-PEEK) composite is 855 J/m, while for PEEK the impact resistance is only 385 J/m. The impact resistance reaches a maximum value of 914 J/m at 20/80% (CNF-CF-PSU)/(CNF-CF-PEEK). For the remaining compositions, the impact resistance ranges between about 492-550 J/m. The minimum impact resistance of 399 J/m occurs at 100% (CNF-CF-PSU).

Morphological Structure

PSU/PEEK

The morphology of each PSUPEEK composition is revealed by electron micrograph images taken perpendicular to the machine or extrusion direction. Good mixing between the PSU and PEEK is evident by the fine structure and distribution of the two phases. PEEK is a semi-crystalline polymer and does attempt to increase density and shrink upon crystallization during cooling in the mold in a stepwise manner, while PSU is amorphous and does not attempt this type of step change in volume reduction.

At 20 wt % PSU in PEEK (a), PEEK is the primary matrix with well distributed nano-scale PSU fibers in intimate contact with the matrix. The PSU fiber diameter ranges from 200-500 nm. Most PSU fibers fractured, while others pulled out from the PEEK matrix and appear as holes. At 40 and 45 wt % PSU in PEEK (b) and (c), both phases appear to be continuous and intertwined with one another. The dual phase, co-continuous structure was predicted to occur at 45% PSU in PEEK. It is difficult to distinguish the PSU phase from the PEEK phase. Nevertheless, it is apparent that the PSU and PEEK domains are much less than 1,000 nm. Here, the PEEK phase attempts to shrink upon crystallization and applies hydrostatic like pressure on the PSU phase that inhibits the PEEK volume reduction. At 50 wt % PSU in PEEK (d), a phase inversion occurred, and PSU is the primary matrix with discrete PEEK fibers well distributed. At 50 and 60 wt % PSU in PEEK (d) and (e), the PEEK fiber diameter ranges from 200-1,000 nm, and the fibers appear to have shrunken away from the PSU matrix. This is due to the semi-crystalline nature of PEEK and the volume reduction that occurs upon crystallization during cooling from the melt. However, the 80 wt % PSU in PEEK micrograph shows intimate contact between the PEEK fiber and PSU matrix, which suggests lower crystallinity in the PEEK phase. Heat treating the blends may increase mechanical stress distribution between the phases.

The morphology of 100% (CNF-CF-PSU) and (CNF-CF-PEEK) is revealed by electron micrograph images taken at various scales and magnification. The images are taken perpendicular to the machine or extrusion direction. PEEK exhibits superior bonding with the carbon fiber, in comparison to PSU. The carbon nanofiber appears to bond with the polymers at the ends rather than along the length of the fiber. The two polymer phases are so well-mixed that they are nearly indistinguishable from one another.

Discussion

The addition of PSU to PEEK improves the impact resistance and % strain to yield while reducing costs. For example, by adding 20% PSU to PEEK, modulus, stress at yield and stress at break decrease only by 6, 2.3, and 6.7%, while impact resistance increases by 13.4%, compared to 100% PEEK. According to current resin prices for PSU ($17/1b) and PEEK ($46/1b) this would incur a savings of $5.80/1b. The addition of PSU to PEEK also acts like a processing aid and requires lower pressure during injection molding, making it easier to form complex shapes.

Furthermore, PSU has a lower viscosity than PEEK at the processing temperatures and provides a medium for self-alignment during processing of carbon fiber and carbon nanofibers within the total PSU/PEEK composite. This orientation effect will provide enhanced mechanical and electrical properties.

A summary of the impact resistance properties of the compositions of the invention is presented in the table below.

|  | Impact Resistance (% PSU component in PEEK component) | | | | | | | |
|---|---|---|---|---|---|---|---|---|
| Composition | 0% | 20% | 40% | 45% | 50% | 60% | 80% | 100% |
| PSU/PEEK | 385 | 437 | 496 | 507 | 440 | 325 | 243 | 166 |
| (CNF-PSU)/PEEK | 385 | 350 | 400 | 322 | 415 | 332 | 226 | 210 |
| (CF-PSU)/PEEK | 385 | 457 | 469 | 418 | 429 | 443 | 405 | 379 |
| (CNF-CF-PSU)/PEEK | 385 | 432 | 413 | 466 | 421 | 416 | 363 | 330 |
| (CNF-CF-PSU)/(CNF-CF-PEEK) | 855 | 914 | 553 | 550 | 492 | 516 | 511 | 399 |

It will be understood by those of skill in the art that numerous and various modifications can be made without departing from the spirit of the present invention. Therefore, it should be clearly understood that the various embodiments of the present invention described herein are illustrative only and are not intended to limit the scope of the present invention.

What is claimed:

1. A co-continuous immiscible polymer blend of a polysulfone in a polyaryletherketone matrix, wherein polysulfone fibers are distributed within the polyaryletherketone matrix.

2. The co-continuous immiscible polymer blend of claim 1, wherein the blend is reinforced with carbon fibers.

3. The co-continuous immiscible polymer blend of claim 1, wherein the polysulfone has the structure

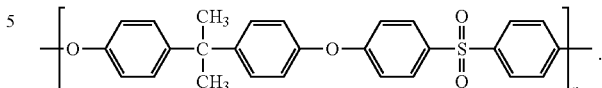

4. The co-continuous immiscible polymer blend of claim 1, wherein the polyaryletherketone is polyetheretherketone (PEEK), having the structure

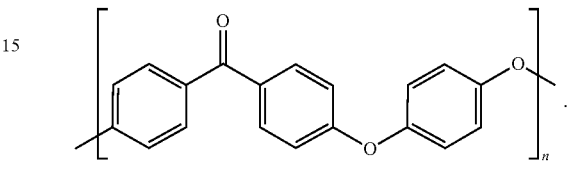

5. The co-continuous immiscible polymer blend of claim 2, wherein the carbon fiber is selected from the group consisting of chopped carbon micro-fiber (CF), carbon nanofiber (CNF) and mixtures thereof.

6. The co-continuous immiscible polymer blend of claim 1, wherein the amount of the polysulfone in the polyaryletherketone ranges from about 20% to about 50% by weight.

7. The co-continuous immiscible polymer blend of claim 6, wherein the amount of the polysulfone in the polyaryletherketone ranges from about 40% to about 50% by weight.

8. The co-continuous immiscible polymer blend of claim 6, wherein the amount of the polysulfone in the polyaryletherketone is about 45% by weight.

9. The co-continuous immiscible polymer blend of claim 5, wherein the carbon fiber comprises carbon micro-fiber present in an amount ranging from about 5% to about 30% by weight.

10. The co-continuous immiscible polymer blend of claim 9, wherein the amount of carbon micro-fiber present ranges from about 15% to about 25% by weight.

11. The co-continuous immiscible polymer blend of claim 9, wherein the amount of carbon micro-fiber present is about 20% by weight.

12. The co-continuous immiscible polymer blend of claim 5, wherein the carbon fiber comprises carbon nanofiber present in an amount ranging from about 0.5% to about 5% by weight.

13. The co-continuous immiscible polymer blend of claim 12, wherein the amount of carbon nanofiber present ranges from about 1% to about 4% by weight.

14. The co-continuous immiscible polymer blend of claim 12, wherein the amount of carbon nanofiber present is about 2.5% by weight.

15. The co-continuous immiscible polymer blend of claim 5, wherein the carbon fiber comprises carbon nanofiber present in an amount from about 0.5% to about 2% by weight together with carbon micro-fiber in an amount from about 5% to about 15% by weight.

16. The co-continuous immiscible polymer blend of claim 15, wherein carbon nanofiber is present in an amount of about 1% by weight together with carbon micro-fiber an amount of about 10% by weight.

17. A method of preparing a co-continuous immiscible polymer blend of a polysulfone in a polyaryletherketone matrix reinforced with carbon fiber, comprising the steps of:
  a) preparing a carbon fiber-reinforced polysulfone, containing a reinforcing amount of carbon micro-fiber, carbon nanofiber, or a mixture thereof;

b) blending the carbon fiber-reinforced polysulfone with a polyaryletherketone, optionally reinforced with a reinforcing amount of carbon micro-fiber, carbon nano-fiber, or a mixture thereof, in a blend ratio where the viscosity ratio of the components is equivalent to the composition ratio at constant processing temperature and shear rate, using mixing conditions that impart elongational flow and distributive mixing.

* * * * *